(12) United States Patent
Richards et al.

(10) Patent No.: US 11,282,262 B2
(45) Date of Patent: *Mar. 22, 2022

(54) SYSTEMS AND METHODS FOR DISTRIBUTED SCALABLE RAY PROCESSING

(71) Applicant: Imagination Technologies Limited, Kings Langley (GB)

(72) Inventors: Joseph M. Richards, San Francisco, CA (US); Luke T. Peterson, San Francisco, CA (US); Steven J. Clohset, San Francisco, CA (US)

(73) Assignee: Imagination Technologies Limited, Kings Langley (GB)

( * ) Notice: Subject to any disclaimer, the term of this patent is extended or adjusted under 35 U.S.C. 154(b) by 0 days.

This patent is subject to a terminal disclaimer.

(21) Appl. No.: 17/127,207

(22) Filed: Dec. 18, 2020

(65) Prior Publication Data
US 2021/0142548 A1 May 13, 2021

Related U.S. Application Data

(63) Continuation of application No. 16/870,125, filed on May 8, 2020, now Pat. No. 10,902,667, which is a continuation of application No. 15/800,427, filed on Nov. 1, 2017, now Pat. No. 10,657,700, which is a continuation of application No. 15/062,367, filed on Mar. 7, 2016, now Pat. No. 9,830,734.

(60) Provisional application No. 62/128,654, filed on Mar. 5, 2015.

(51) Int. Cl.
| | |
|---|---|
| *G06T 15/06* | (2011.01) |
| *G06T 15/80* | (2011.01) |
| *G06T 1/60* | (2006.01) |
| *G06T 1/20* | (2006.01) |
| *G06T 15/00* | (2011.01) |
| *G06T 15/08* | (2011.01) |
| *G06F 12/00* | (2006.01) |
| *G06F 12/0813* | (2016.01) |

(52) U.S. Cl.
CPC .............. *G06T 15/06* (2013.01); *G06F 12/00* (2013.01); *G06T 1/20* (2013.01); *G06T 1/60* (2013.01); *G06T 15/005* (2013.01); *G06T 15/08* (2013.01); *G06T 15/80* (2013.01); *G06F 12/0813* (2013.01); *G06F 2212/452* (2013.01); *G09G 2360/121* (2013.01)

(58) Field of Classification Search
None
See application file for complete search history.

(56) References Cited

U.S. PATENT DOCUMENTS

| | | |
|---|---|---|
| 8,072,454 B1 | 12/2011 | Aila et al. |
| 2009/0262132 A1 | 10/2009 | Peterson et al. |
| 2009/0322752 A1 | 12/2009 | Peterson et al. |
| 2011/0320719 A1 | 12/2011 | Mejdrich et al. |

(Continued)

*Primary Examiner* — Joni Hsu
(74) *Attorney, Agent, or Firm* — Potomac Law Group, PLLC; Vincent M DeLuca

(57) ABSTRACT

Ray tracing systems have computation units ("RACs") adapted to perform ray tracing operations (e.g. intersection testing). There are multiple RACs. A centralized packet unit controls the allocation and testing of rays by the RACs. This allows RACs to be implemented without Content Addressable Memories (CAMs) which are expensive to implement, but the functionality of CAMs can still be achieved by implemented them in the centralized controller.

20 Claims, 14 Drawing Sheets

(56) References Cited

U.S. PATENT DOCUMENTS

2016/0071313 A1 3/2016 Laine et al.
2016/0085551 A1 3/2016 Greathouse et al.

Central Packet Unit Packet Processes

SYSTEMS AND METHODS FOR DISTRIBUTED SCALABLE RAY PROCESSING

BACKGROUND

Field

In one aspect, the disclosure generally relates to 3-D rendering systems, system architectures, and methods, and in a more particular aspect, the disclosure relates to systems, architectures, and methods for asynchronous and concurrent hybridized rendering, such as hybridized ray tracing and rasterization-based rendering.

Description of Related Art

Graphics Processing Units (GPUs) provide highly parallelized rasterization-based rendering hardware. A traditional graphics processing unit (GPU) used a fixed pipeline only for rendering polygons with texture maps and gradually evolved to a more flexible pipeline that allows programmable vertex and fragment stages. Even though modern GPUs support more programmability of geometry and pixel processing, a variety of functions within a GPU are implemented in fixed function hardware. Modern GPUs can range in complexity, with high performance GPUs having transistor budgets on the order of 4-6 billion transistors. GPUs are often used in real time rendering tasks, and optimizations for many GPU applications involve determining shortcuts to achieve a desired throughput of frames per second, while maintaining a desired level of subjective video quality. For example, in a video game, realistic modeling of light behavior is rarely an objective; rather, achieving a desired look or rendering effect is often a principal objective.

Traditionally, ray tracing is a technique used for high quality, non-real time graphics rendering tasks, such as production of animated movies, or producing 2-D images that more faithfully model behavior of light in different materials. In ray tracing, control of rendering and pipeline flexibility to achieve a desired result were often more critical issues than maintaining a desired frame rate. Also, some of the kinds of processing tasks needed for ray tracing are not necessarily implementable on hardware that is well-suited for rasterization.

SUMMARY

Several architecture examples are described to provide for scalable and modularized processing of discretized compute portions. These examples primarily relate to the discretized compute portions being ray tracing rendering computation. These examples also provide for economizing memory accesses according to disclosed techniques.

Some examples described herein provide fully centralized decision of testing of rays against nodes and allocation of micropacket IDs, but distributed ray packet storage (e.g., a central packet unit has packets of micropackets, and assigns micro packets to testers).

The description may use the term "micropacket" to refer a packet being managed by a single computation unit, and "packet" to refer to an aggregation of micropackets by a central element. However, in some instances the term "packet" may be used to refer to either "micropackets" or "packets", but the context disambiguates.

There is provided a machine-implemented method of processing rays, comprising:

at each of a plurality of computation units,
  processing rays for intersection with nodes of an acceleration structure, wherein each node of the acceleration structure is associated with a respective node identifier, and each of the computation units comprises a respective ray definition memory that stores definition data for rays,
  outputting a node identifier and a number of rays;
at a central collector coupled with each of the plurality of computation units,
  receiving the node identifier and the number of rays,
  allocating one or more ray packet identifiers based on the number of rays,
  returning the allocated one or more ray packet identifiers to the computation unit that outputted the node identifier and the number of rays,
  updating or creating, in a packet memory, a collection of ray packet identifiers indexed by a node identifier determined from the received node identifier to include the allocated one or more ray packet identifiers, thereby associating the node identified by the received node identifier with the allocated one or more ray packet identifiers,
  receiving, by the respective computation unit that outputted the node identifier and the number of rays, the ray packet identifiers allocated by the central collector, and storing, in a ray packet index memory local to that computation unit, data associating an identifier for each ray counted in the number of rays with at least one of the ray packet identifiers.

The method may further comprise determining, by the respective computation unit, each of the ray identifiers according to an address in the ray definition memory that stores or will store definition data for that ray.

The rays may be virtual rays.

Once assigned, the ray identifiers may be invariant during the processing of each ray and each ray may have definition data in a single ray definition memory, among all of the computation units.

The method may further comprise executing a shader, by a general purpose processor coupled to the respective computation unit, that produces the rays processed by that computation unit.

The method may further comprise determining by the central collector, each ray packet identifier according to a location of the entry in the ray packet index memory of the computation unit that will store data associating the ray identifiers with the one or more packet identifiers.

The method may further comprise selecting rays to be processed, at one or more of the computation units, by a method comprising indexing the ray packet index memory of that computation unit using a ray packet identifier received from the central collector to obtain a list of ray identifiers, using the ray identifiers to obtain definition data for rays identified by the list of ray identifiers, from the ray definition data memory of that computation unit, and testing the identified rays for intersection, using the definition data, with the node of the acceleration structure that was associated with the ray packet identifier by the central collector.

The method may further comprise selecting, by the central collector, one or more of the collections of ray packet identifiers, and outputting the ray packet identifiers in the one or more selected collections to the plurality of computation units, and at each of the computation units, determining which of the ray packet identifiers refers to a location within the ray packet index memory of that computation unit.

The method may further comprise reporting, by each of the computation units, packet identifiers for which processing has been completed, and responsively returning, by the central collector, reported packet identifiers to a free list.

The method may further comprise maintaining, by the central collector, a free packet identifier list for each computation unit, indicating which packet identifiers are available for assignment, for that computation unit.

Each packet identifier may identify a location in the packet index memory of a respective computation unit that can store up to a predetermined maximum number of ray identifiers, and the method may further comprise, by the central collector, pulling a number of packet identifiers from the respective free list of the computation unit that outputted the node identifier and the number of rays, in order to refer to enough memory to store ray identifiers for the number of rays.

The method may further comprise implementing each of the free lists as a set of packet identifiers, and providing a bit for each packet identifier indicating whether that packet identifier is free or used.

Each of the plurality of computation units may execute a selection process to determine an order of ray processing by that computation unit. The selection process may comprise using receipt of a ray packet identifier from the central collector as an indicator that data defining the node to which that ray packet identifier was associated will be stored in a cache memory from which that computation unit can read. The selection process may comprise prioritizing the processing of rays for which ray packet identifiers were received within a window of time after receipt thereof.

The method may further comprise including, by the central collector, in a memory location including data defining the collection in the memory, a reference to another location in the memory that stores further ray packet identifiers of that collection.

The method may further comprise determining, by the central collector, to cause further processing of a selected collection of ray packet identifiers, retrieving the ray packet identifiers and causing the plurality of computation units to receive ray packet identifiers that correspond to locations in the ray packet index memory of that computation unit.

The central collector may perform the updating or creating by a method comprising determining a set of node identifiers for child nodes of the received node identifier, and making a respective collection for each of the child nodes.

The central collector may perform the updating or creating by a method comprising using the received node identifier to create or update a collection indexed by that node identifier, and when the central collector determines to test a particular collection, the central collector causes retrieval of data defining a set of child nodes of the acceleration structure node associated with the particular collection.

There is provided a rendering system comprising:
  a plurality of computation units, each comprising a ray definition memory and a ray packet index memory, each of the computation units being configured to:
  process rays for intersection with nodes of an acceleration structure, wherein each
  node of the acceleration structure is associated with a respective node identifier, store definition data for rays in its definition memory, and
    output a node identifier and a number of rays;
  a central collector coupled with each of the plurality of computation units, the central collector comprising a packet memory, wherein the central collector is configured to:
    receive the node identifier and the number of rays,
    allocate one or more ray packet identifiers based on the number of rays,
    return the allocated one or more ray packet identifiers to the computation unit that outputted the node identifier and the number of rays, and
    update or create, in the packet memory, a collection of ray packet identifiers indexed by a node identifier determined from the received node identifier to include the allocated one or more ray packet identifiers, thereby associating the node identified by the received node identifier with the allocated one or more ray packet identifiers,
  wherein each of the computation units is configured to receive the ray packet identifiers allocated to that computation unit by the central collector, and to store, in the ray packet index memory local to that computation unit, data associating an identifier for each ray counted in the number of rays with at least one of the ray packet identifiers.

Some examples described herein provide fully distributed decisions for testing of rays against nodes.

For example, there is provided a machine-implemented method of processing rays, comprising:
  at a computation unit of a plurality of computation units,
    selecting a group of rays to be processed for intersection with an element of an acceleration structure, wherein each element of the acceleration structure bounds a respective selection of geometry located in a 3-D space, and the element of the acceleration structure is identifiable with a identifier,
    indicating the identifier to the other computation units of the plurality of computation units,
    initiating retrieval, from a memory, of data defining the element of the acceleration structure,
    obtaining data defining the rays of the group of rays from a memory local to the computation unit,
    determining whether each of the rays hits or misses the element of the acceleration structure, and
  at the other computation units of the plurality of computation units,
    indexing a memory using the identifier to determine whether a respective local memory to that computation unit contains definition data for a group of rays to be tested for intersection with the element of the acceleration structure identifiable with the identifier;
    determining whether to schedule testing of that group of rays for intersection in that computation unit, or another group of rays, for which definition data is stored in the respective local memory of that computation unit, for intersection with one or more other acceleration structure elements.

The initiating retrieval from the memory of data defining the element of the acceleration structure may comprise loading the data from a main memory into a cache, and if any of the other computation units determine to test a respective group of rays for intersection with that element of the acceleration structure, each of those computation units may retrieve the data from the cache in order to perform the testing.

The initiating retrieval from the memory of data defining the element of the acceleration structure may comprise loading the data from a main memory into a cache, and if any of the other computation units determine to test a respective group of rays for intersection with that element of the acceleration structure, each of those computation units may receive the data from the computation unit that initially selected the group of rays.

The method may further comprise, at each of the computation units, maintaining a queue of identifiers received from other computation units.

The method may further comprise, providing each of the computation units a respective opportunity to make a selection of an element of the acceleration structure, for which that computation unit will test one or more groups of rays for intersection, and thereafter choosing by the other of the computation units whether or not to use that same element of the acceleration structure in an intersection test.

Some examples described herein provide partially distributed and partially centralized decisions for testing of rays against nodes.

For example, there is provided a machine-implemented method of processing rays, comprising:

at each of a plurality of computation units, each of the computation units comprising a respective private memory that stores definition data for rays,
  determining for each ray of a group of rays whether or not that ray intersects a node of an acceleration structure,
  for each node of the acceleration structure, grouping each of the rays of the group of rays that intersected that node into a respective group,
  associating one or more micropacket identifiers with the group of rays,
  storing, in a micropacket memory, at locations indicated by the one or more micropacket identifiers, a respective identifier for each ray in the group of rays,
  outputting, for each group of rays, a node identifier and one micropacket identifier of the one or more micropacket identifiers associated with the group of rays, at a central collector coupled with each of the plurality of computation units,
  receiving the node identifier and the one micropacket identifier,
  determining a location in a packet memory that is or will be indexable by the node identifier,
  storing the micropacket identifier in the packet memory, at the determined location,
  selecting a node for further processing,
  determining one or more locations in the packet memory storing micropacket entries based on the maintained association between node identifiers and locations in the packet memory, and
  outputting the micropacket identifiers obtained from the one or more locations in the packet memory for receipt by respective computation units of the plurality that originally provided such micropacket identifiers to the central collector.

The method may further comprise, at each of the plurality of computation units, making a chain of references to micropacket identifiers that store ray identifiers for rays that are to be processing further together.

Each ray identifier may be a memory address in a memory at which definition data for that ray is stored.

Rendering systems may be configured to implement any of the methods described herein.

For example, for the distributed tracking and centralized scheduling indications (i.e., the intermediately distributed option), there is provided a rendering system, comprising:

a plurality of computation units, each with a respective local memory storing definition data for rays and configurable to test a ray, using its definition data from the local memory, for intersection with a geometric shape, and to maintain collections of ray identifiers, each collection indexable by an identifier for an element of an acceleration structure to be tested for intersection with rays identified by the ray identifiers of that collection;

a central collection element, coupled with the plurality of computation units, wherein the central collection element is configured to indicate elements of the acceleration structure to be tested by the plurality of computation units with rays for which definition data is stored in the respective local memories of the plurality of computation units;

wherein each of the plurality of computation units is configured to indicate, to the central collection element, an identifier for an element of the acceleration structure and a number of rays, stored in the local memory of that computation unit, that need to be tested for intersection with that identified element of the acceleration structure, and the central collection element is configured to update a memory tracking the identified elements of the acceleration structure and a respective number of rays that need to be tested for intersection with each of the identified elements, and to indicate to the plurality of computation units identifiers for elements of the acceleration structure, and each of the computation units is configured to index the collections with the identifiers for the elements of the acceleration structure and schedule testing of rays according to results of the indexing.

Each of the computation units may comprise a packet memory, separate from the memory storing the ray definition data, that stores ray identifiers of each collection, in association with the identifier for the element of the acceleration structure associated with that collection.

Each of the computation units may comprise a packet index memory, the packet index memory storing the identifier for the element of the acceleration structure, and one or more micropacket identifiers, each micropacket identifier indicating a memory location storing a set of ray identifiers in the collection ray identifiers associated with that acceleration structure element identifier.

Systems and methods are described herein that relate to the return of results for processing. The systems and methods vary according to the implementation. Central collector may have multiple banks. There may be arbitration for bank access. There may be a delay, random, pseudorandom, or planned so that bank accesses are more distributed. There may be a bus on which different computation units indicate an intent to address one bank of the collector, and different lanes of data bus to that bank can be populated by different computation units. Some amount of out of order buffering or reordering can be provided in each computation unit, to allow some arbitration or backoff of some computation units, to reduce contention to a shared resource. The computation units may be referred to herein as "ray tracing accelerators" or "Ray Clusters" or simply "RACs". The central collector may cause fetching of data and distribution to those RACs that will use the data.

The rendering systems described herein may be embodied in hardware on an integrated circuit. There may be provided a method of manufacturing, at an integrated circuit manufacturing system, a rendering system. There may be provided an integrated circuit definition dataset that, when processed in an integrated circuit manufacturing system, configures the system to manufacture a rendering system.

There may be provided a non-transitory computer readable storage medium having stored thereon a computer readable description of an integrated circuit that, when processed, causes a layout processing system to generate a circuit layout description used in an integrated circuit manufacturing system to manufacture a rendering system.

There may be provided an integrated circuit manufacturing system comprising:
- a non-transitory computer readable storage medium having stored thereon a computer readable integrated circuit description that describes a rendering system as described herein;
- a layout processing system configured to process the integrated circuit description so as to generate a circuit layout description of an integrated circuit embodying the rendering system; and
- an integrated circuit generation system configured to manufacture the rendering system according to the circuit layout description.

There may be provided computer program code for performing any of the methods described herein. There may be provided a non-transitory computer readable storage medium having stored thereon computer readable instructions that, when executed at a computer system, cause the computer system to perform any of the methods described herein.

The above features may be combined as appropriate, as would be apparent to a skilled person, and may be combined with any of the aspects of the examples described herein.

BRIEF DESCRIPTION OF THE DRAWINGS

For a fuller understanding of aspects and examples disclosed herein, reference is made to the accompanying drawings in the following description.

DETAILED DESCRIPTION

The following description is presented to enable a person of ordinary skill in the art to make and use various aspects of the inventions. Descriptions of specific techniques, implementations and applications are provided only as examples. Various modifications to the examples described herein may be apparent to those skilled in the art, and the general principles defined herein may be applied to other examples and applications without departing from the scope of the invention.

In one aspect of the disclosure, ray tracing tasks proceed concurrently with rasterization tasks. Techniques to avoid performing ray tracing tasks that can be determined not to contribute to a final rendering product are disclosed.

Ray tracing systems are described herein where computation units ("RACs") are adapted to perform ray tracing operations (e.g. intersection testing). There are multiple RACs. There is provided a centralized packet unit to control the allocation and testing of rays by the RACs. This allows RACs to be implemented in some examples with few or no Content Addressable Memories (CAMs) which are expensive to implement, but the functionality of CAMs can still be achieved by implementing them in the centralized controller. A CAM is a hardware structure that determines if a value is contained therein, and if so, maps the value back to additional data. It may be implemented as a hashing function to retrieve an address, and then a set of slots at each address that can be inspected and/or other behaviors may be implemented to handle hash-space collisions. CAMs are used to implement caches, but the idea of a content addressable memory is applicable more generally than to just caches.

Figure 1:
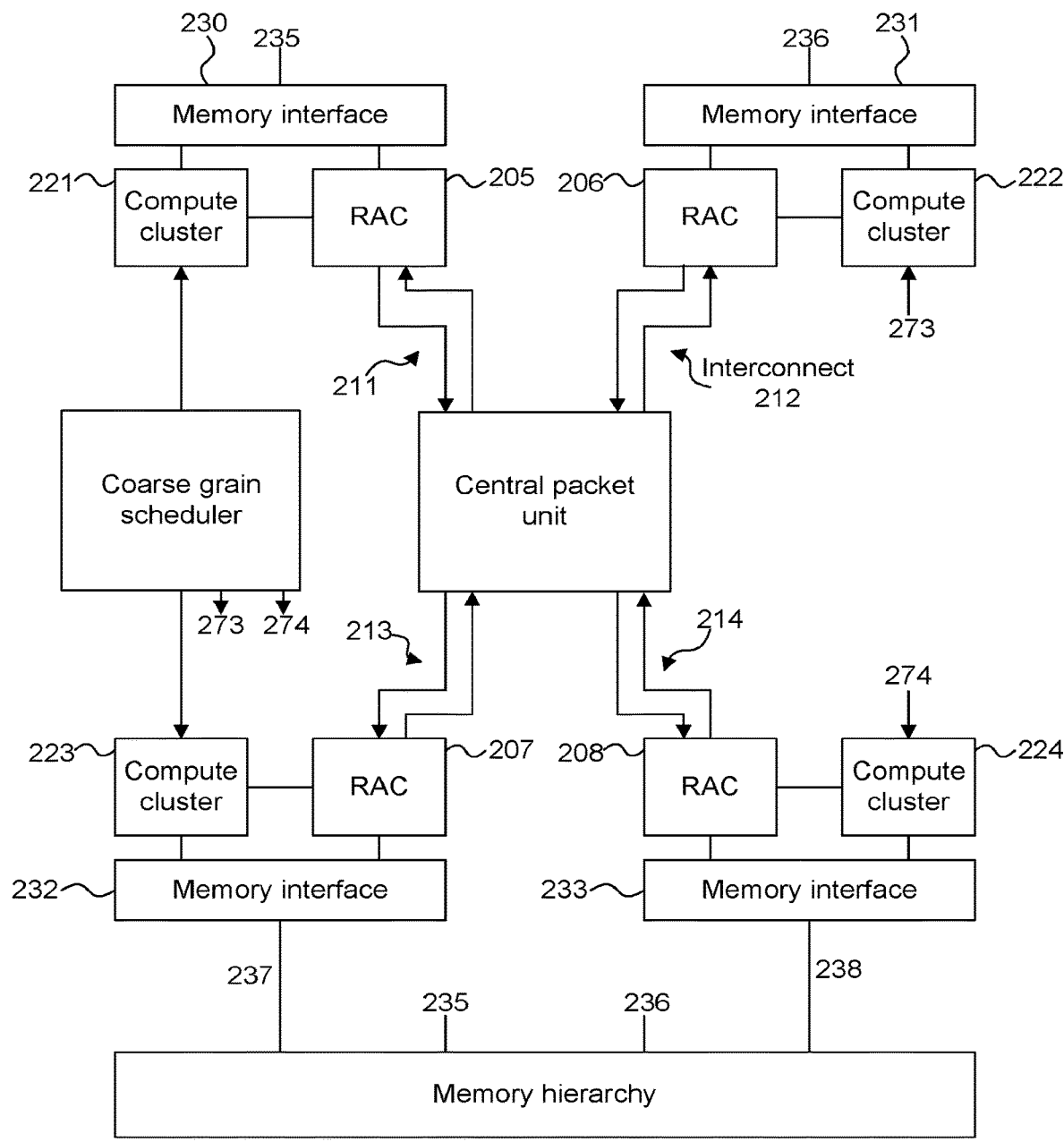
FIG. 1 depicts an overview of a system of distributed ray tracing accelerators (RAy Clusters (RACs)) with a centralized unit.

FIG. 1 depicts elements that are numbered and labeled descriptively. Compute clusters (e.g. 221-224) are, for example, generally programmable elements that can operate on programmable workloads, such as a processor core, a set of cores, shading units of a graphics processor, and so on. In some examples, these units execute vertex and pixel shaders for rasterization as well as shaders for ray tracing. The ray tracing accelerators (RACs) 205-208 (which may also be referred to herein as "computation units") handle specialized processing required for traversing rays through an acceleration structure and for testing rays for intersection with scene geometry. In other words, the RACs are arranged in a manner to facilitate efficient execution of ray tracing tasks, such as intersection testing. The RACs may be implemented in fixed-function hardware (e.g. dedicated circuitry) to accelerate ray tracing operations such as intersection testing. Each of the RACs is coupled to a respective compute cluster as shown in FIG. 1. Furthermore, with each pair RAC-compute cluster pair is a memory interface (230-233) to allow data to be passed between a memory hierarchy 245 and the RACs and/or the compute clusters. A coarse grain scheduler 270 is coupled to each of the compute clusters 221-224 to schedule the shading operations performed thereon. Each of the RACs is coupled to a central packet unit 203, which may be referred to herein as a "central collector", or sometimes simply "central".

Figure 2:
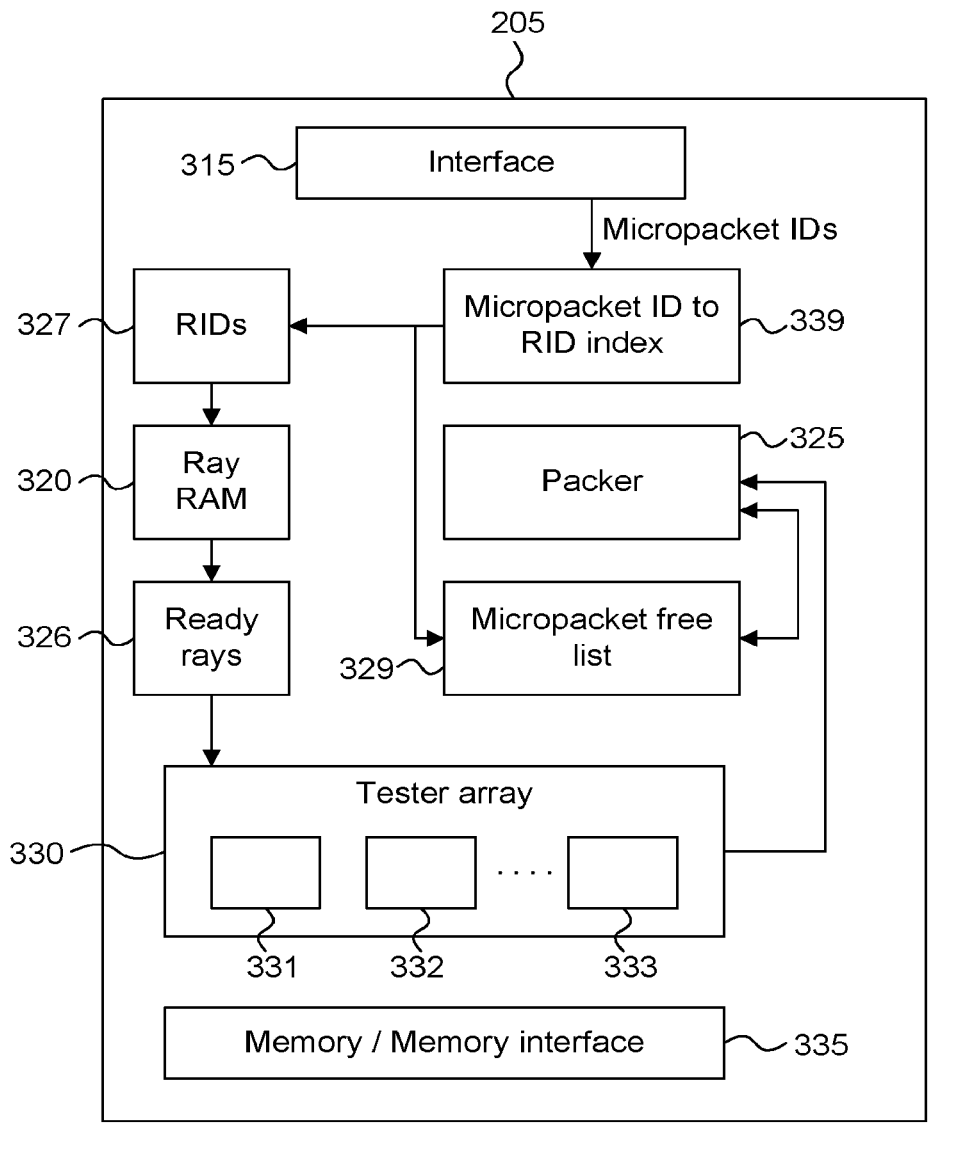
FIG. 2 depicts an example implementation of a RAC of FIG. 1.
Figure 2:

FIG. 2 shows an example block diagram of RAC 205. Each of the RACs will have a corresponding structure. Each RAC interfaces 315 with the central packet unit 203. Memory interface 335 interfaces with the memory hierarchy 245. Implementations can have these interfaces implemented across the same bus or through point to point links, or any other suitable mechanism. The RAC 205 includes a ray definition memory 320 (which may be referred to herein as a ray RAM 320) which stores data relating to rays to be tested for intersection with geometry in a scene. The RAC 205 also includes a ray packet index memory 339 which stores ray identifiers (or "Ray IDs" or simply "RIDs").

Block 327 represents ray IDs which have been identified from the ray packet index memory 339, and can be used to identify locations in the ray RAM 320 at which definition data is stored for that ray. A memory denoted "Ready rays 326" in FIG. 2 stores rays that have their definition data available and are ready to be tested in tester array 330. The ready rays memory 326 can be accessed according to any suitable scheme, e.g. a FIFO, or serial scheme. In one implementation, ray RAM 320 is basically a register file that can be accessed by the tester array 330, and ready rays 326 or other staging or local caching or queuing is not needed. The tester array 330 includes a number of execution units 331-333 for executing operations, e.g. intersection tests between rays and nodes of an acceleration structure or between rays and elements of geometry. In one implementation, tester array 330 tests different rays (in different execution units) against the same element of geometry or the same element of acceleration structure. Definition data for what is tested comes from memory interface 335. In other words, the central packet unit 203 controls which tests are performed by a RAC, such that the RACs can be controlled centrally. However, each RAC can perform its intersection tests independently of other RACs.

As shown in later figures, RAC 205 functions to test rays by receiving a micropacket identifier through interface 315. RAC 205 uses this micropacketID as an index to determine a ray identifier from the ray packet index memory 339. The identified rays are to be tested against a node or a piece of geometry in the tester array 330. The ray packet index memory 339 can simply be a memory, such that the micropacket ID is a location in the memory (IE: doesn't require content associative search in this example.) Micropackets can be chained together, so that data from the location identified by the received micropacketID can identify further locations in the ray packet index memory 339. These further locations also store ray identifiers to be tested against the same node. In some implementations, a nodeID can refer to a parent of child nodes that need to be tested next, rather than nodeIDs directly identifying an acceleration structure element to be tested. So, for example, a packet associated with a nodeID can be tested for intersection with 4 child nodes of the node identified by the nodeID, and then collections established for each of those child nodes with rays that hit each one, for further traversal.

All of the RIDs identified by this are used to obtain definition data for the corresponding rays from ray RAM 320. RIDs can just identify locations in 320 and this also does not need to be content associative. Upon retrieving ray data from locations in the ray RAM 320 identified by the micropacketID(s), information relating to the identified rays can be reported back to the central packet unit 203, either individually or in groups. For example, free list 329 can accumulate freed identifiers for group reporting. This is an optional feature.

Tester array 330 does its processing to implement intersection tests for rays from the ready rays memory 326. If testing nodes of an acceleration structure, then the packer 325 gets results to determine what rays are to be packed together for testing. For example, if a set of rays were tested against one node, then rays that hit are packed together for further traversal of children of the node that was hit, and missing rays are not. For clarity of description, ray identifiers are packed, not ray definition data, which is stationary in ray RAM 320. Locations in index memory 339 can store only a maximum number of ray identifiers, so in some cases, multiple micropacketIDs will be used to propagate testing results. RAC 205 reports the number of rays that need to be propagated to the central packet unit 203, and central 203 provides those from a free list (note that other examples may provide a different approach to managing micropacketIDs.) In order for central 203 to do this, RAC 205 also reports the node ID that was tested, so central 203 can update its node to micropacketID indexing. In this way the central packet unit 203 can manage the distribution of the micropackets of rays between the different RACs 205-208.

Figure 3:
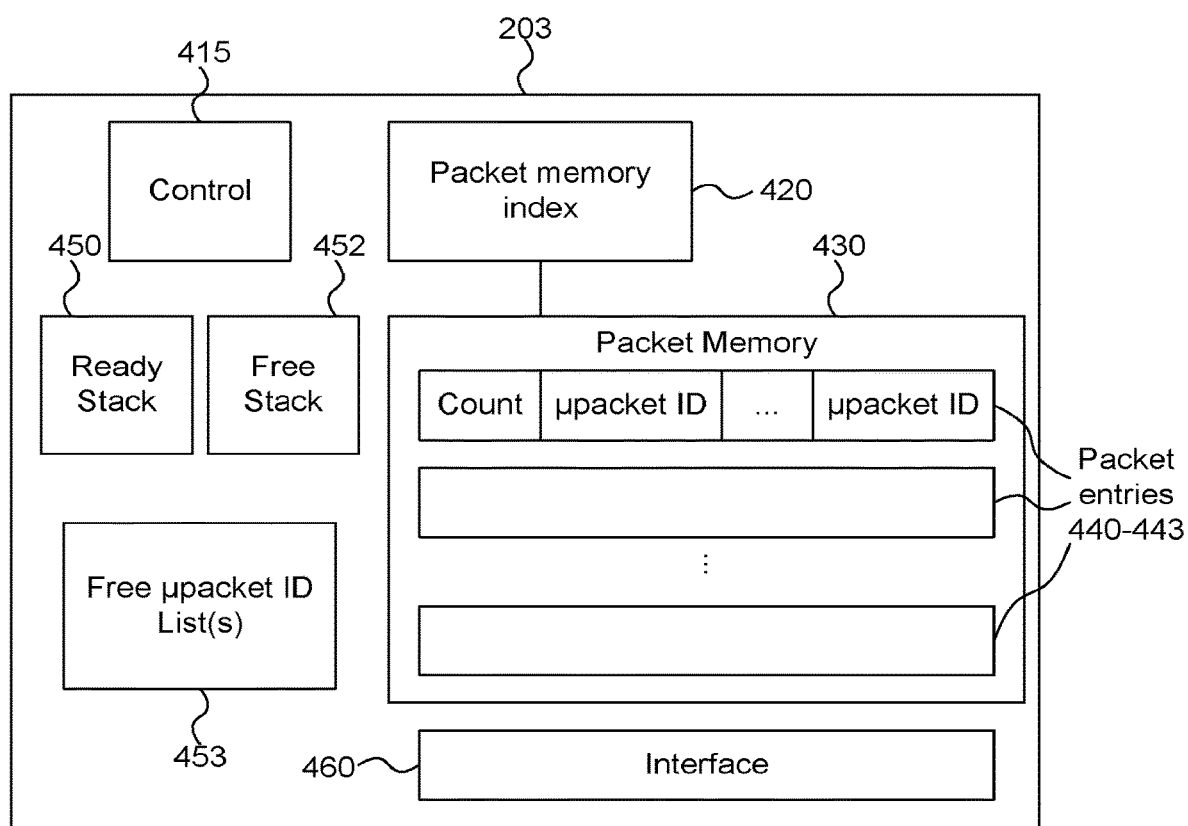
FIG. 3 depicts an example implementation of the centralized unit of FIG. 1.

FIG. 3 shows the structures in the central packet unit 203 in one example. Packet memory index 420 is a Content Addressable Memory (CAM), such that it implements content associative indexing of packets by node ID. An output from the packet memory index 420 is a location in a packet memory 430 that stores a list of micropacketIDs. A Ray count can be stored in index 420 or with each packet entry in the packet memory 430. FIG. 3 shows the ray counts being stored in the packet memory 430. Central 203 also has free and ready stacks 452 and 450 for its packet identifiers. These are consumed and freed according to locations consumed or freed in packet memory 430. Some implementations also can have a free list per RAC, and a unified ready list, or ready list per RAC. In some approaches, there is no ready stack for micropackets, but instead ready stack is only packet IDs and the ready stack is used to index packet memory right before data from entry is output on interface 460. Control unit 415 implements a packet eviction process that determines an order of micropacketIDs output to RACs via the interface 460. This does not necessarily correspond exactly to an order of testing in the RACs. This eviction process can use the ray counts to determine which nodes of the acceleration structure have a suitable number of rays to continue processing. For example, a node with a high number of rays to be tested can cause one or more micropacket to be evicted for intersection testing by the RACs, whilst a node with a lower number of rays to be tested may wait for intersection testing. This may increase the average number of rays to be tested against a node at a time, which can improve the efficiency of the ray tracing process. Other info can be used in eviction decision, including deciding to prioritize packets that reference leaf nodes, since after leaf node geometry testing, those rays can proceed to shading, or be dropped for lack of intersection. Central 203 can initiate pre-fetch of node data corresponding to micropacketIDs output. Such pre-fetch can be qualified by an expected count of reads that will occur for that data. This count can be installed at the cache level to detect particular reads by RACs, and decremented responsive to reads, and ultimately used in an eviction decision process at the cache. These various processes and actions can be conceptualized as independently operating processes, exemplified by FIGS. 6-9.

Figure 6:
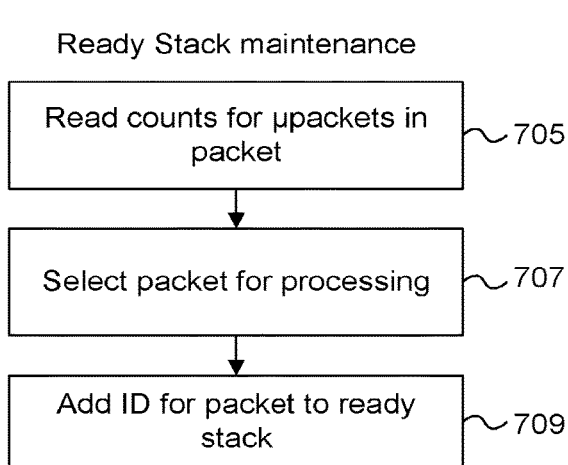
FIGS. 6-9 depict examples of other processes that can be implemented by the centralized unit of FIG. 3.

FIG. 6 shows the maintenance of the ready stack 450 performed by the central packet unit 203. In step 705 the central packet unit 203 reads counts for micropackets in the packet memory 705. In step 707 a packet is selected for processing (e.g. based on the counts). A packet comprises one or more micropackets. In step 709 the ID of the selected packet is added to the ready stack 450 indicating that the one or more micropackets of the packet are ready to be sent to an RAC.

Figure 7:
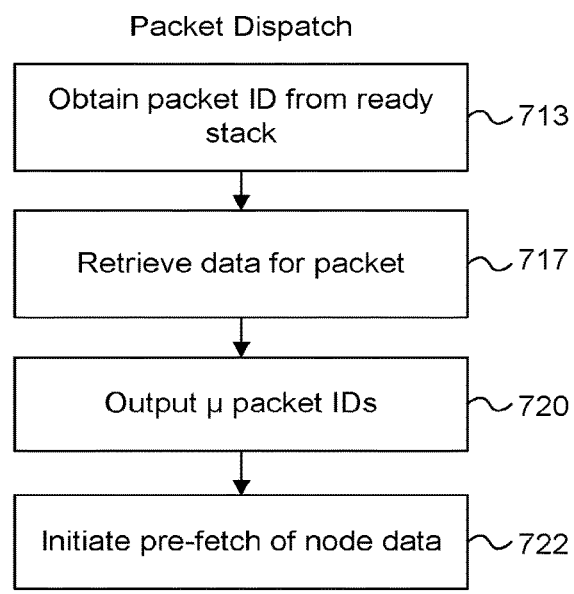

FIG. 7 shows a packet dispatch process performed by the central packet unit 203. In step 713 a packet ID is obtained from the ready stack 450. In step 717 data for the packet is retrieved from the packet memory 430. In step 720 the one or more micropacket IDs for the packet are output, via the interface 460 to one or more RACs. In step 722 pre-fetch of node data is initiated.

Figure 8:
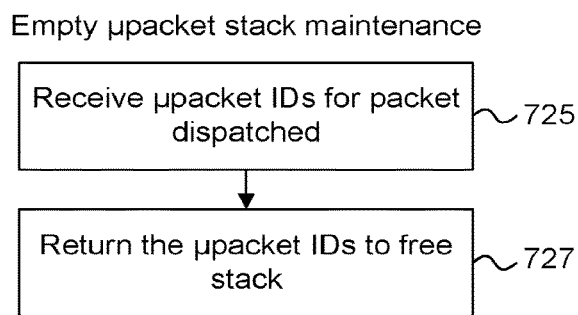

FIG. 8 shows a process for maintaining the empty micropacket list 453 at the central packet unit 203. In step 725 micropacket IDs are received for the packet to be dispatched. In step 727 the received micropacket IDs are returned to the free stack 453. The returned micropacket IDs can therefore be reallocated subsequently.

Figure 9:
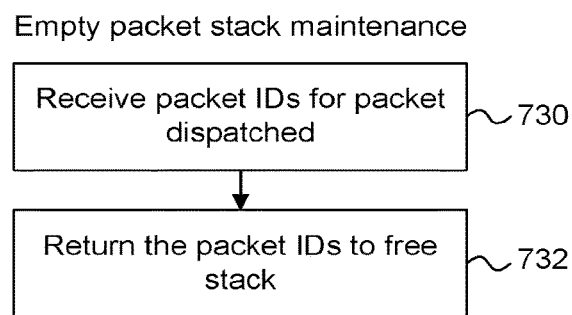

FIG. 9 shows a process for maintaining the empty packet stack 452 at the central packet unit 203. In step 730 a packet ID is received for the packet to be dispatched. In step 732 the received packet ID is returned to the free stack 452. The returned packet IDs can therefore be reallocated subsequently.

Figure 4:
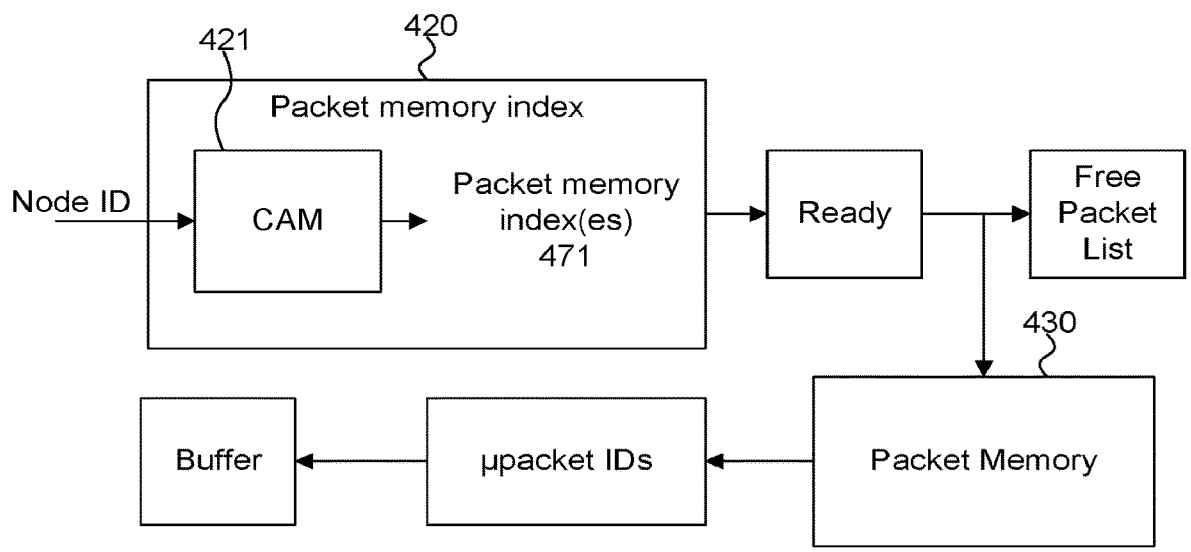
FIG. 4 depicts aspects of an example flow of data in the centralized unit of FIG. 3.
Figure 5:
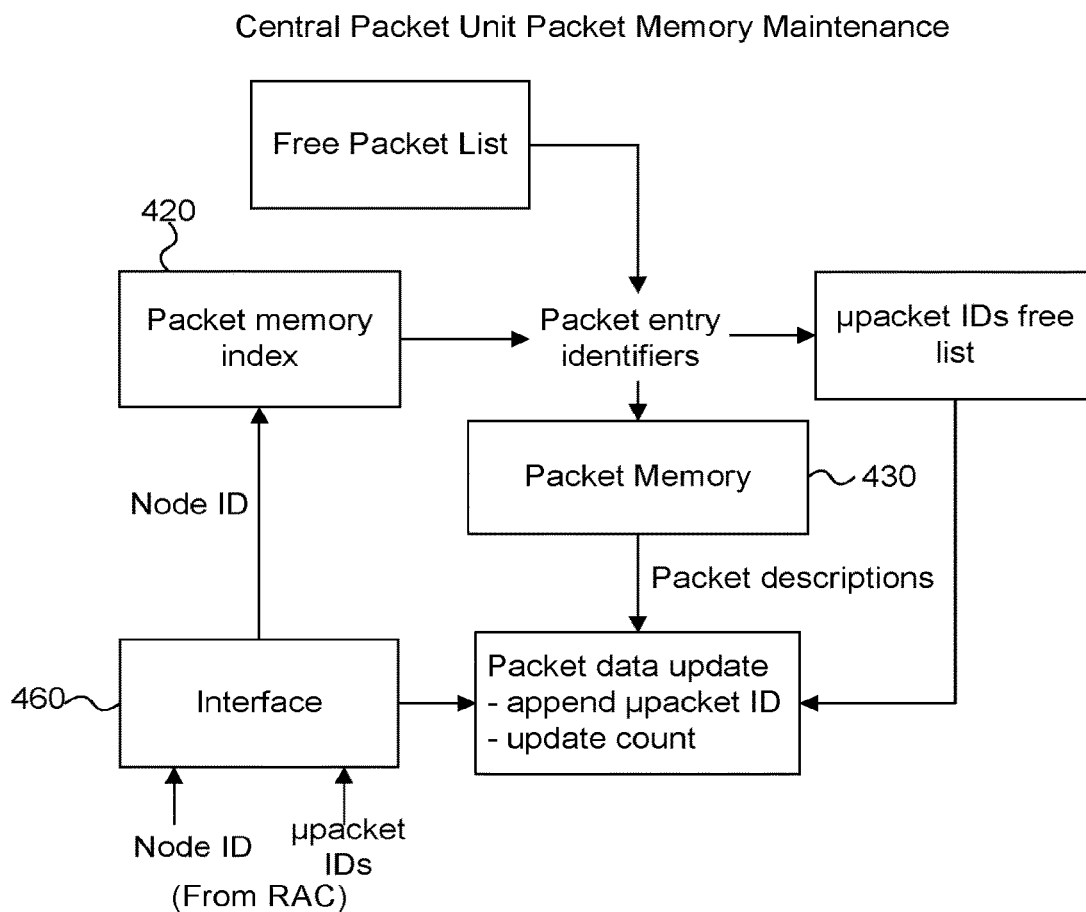
FIG. 5 depicts aspects of an example packet memory maintenance process implemented by the centralized unit of FIG. 3.

FIGS. 4-5 depict examples of data flow through the central packet unit 203. A node ID (e.g. received from one of the RACs indicating a node to be tested) is used to index a content addressable memory (CAM) 421, which produces packet memory indexes (471), that are used to retrieve data from the packet memory 430 indicating micropacketIDs (which are correlated to nodeID by virtue of packet associativity). Packet IDs can go back to free list. MicropacketIDs can go to a buffer awaiting transmission to an RAC. FIG. 5 shows this in more detail. That is, a node ID and a micropacket ID are received at an interface 460 and the node ID is provided to the packet memory index 420 which produces packet memory indexes, which can be used to access a packet from the packet memory 430. The packet descriptions are used to update the packet data, e.g. to append a micropacket ID to the packet memory 430 and to update a count associated with a node. Again, free lists for micropackets can be per RAC or not; some implementations provide for striping of micropacketIDs among the RACs, so that any given micropacketID can be mapped to a RAC by appropriate masking, and hence free micropacketIDs for a particular RAC can be identified from a unitary free list by such masking, or equivalent operation.

Figure 10:
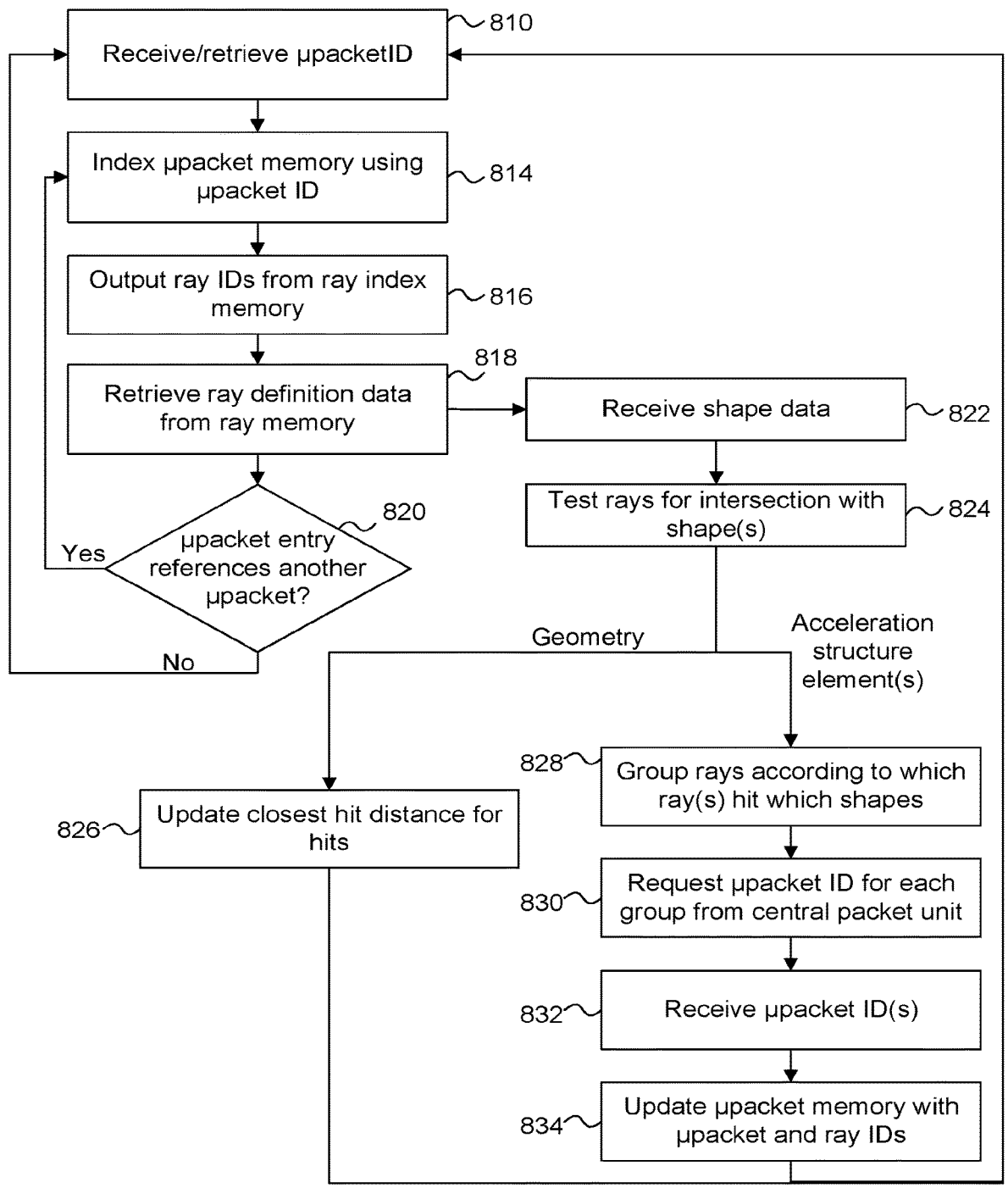
FIG. 10 depicts an example of a process that can be implemented by the RAC of FIG. 2.

FIG. 10 is an example process implemented by RAC 205 according to the above. A corresponding process may be implemented by any of the RACs 205-208. In step 810 the RAC 205 receives one or more micropacket IDs from the central packet unit 203. In step 814 one or more ray IDs are determined from the ray index memory 339 using the micropacket IDs as indexes. In step 816 ray IDs (327) are output from the ray index memory 339. In step 818 ray definition data is retrieved from the ray RAM 320 using the ray IDs as an index. In step 820 it is determined whether there are more micropackets to process (e.g. whether there is a chain of micropackets). If so, the method passes back to step 814 and the method repeats for the next micropacket; but if not the method passes to step 810 and waits for another micropacket ID to be received from the central packet unit 203 indicating the next micropacket to process.

Furthermore, following step 818, in step 822 shape data (e.g. geometry data or node data) is received at the RAC 205, e.g. via memory interface 335, to be tested. In step 824 the tester array 330 performs testing on the rays for intersections with the shapes. If the shapes are geometry in the scene (e.g. primitives representing surfaces of objects in the scene) then in step 826 the closest hit distances for ray hits may be updated when a ray intersects with the geometry. Following step 826 the method passes back to step 810 and waits for another micropacket ID to be received from the central packet unit 203 indicating the next micropacket to process.

If the shape data is a node of an acceleration structure then the method passes from step 824 to step 828 in which rays are grouped according to which rays hit which shapes. In step 830 micropacket IDs for each group are requested from the central packet unit 203, and in step 832 the micropacket IDs are received from the central packet unit 203. In step 834 the micropacket memory index 339 is updated with the received micropacket and ray IDs. The method then passes back to step 810 processes the newly received micropacket (s).

Figure 11:
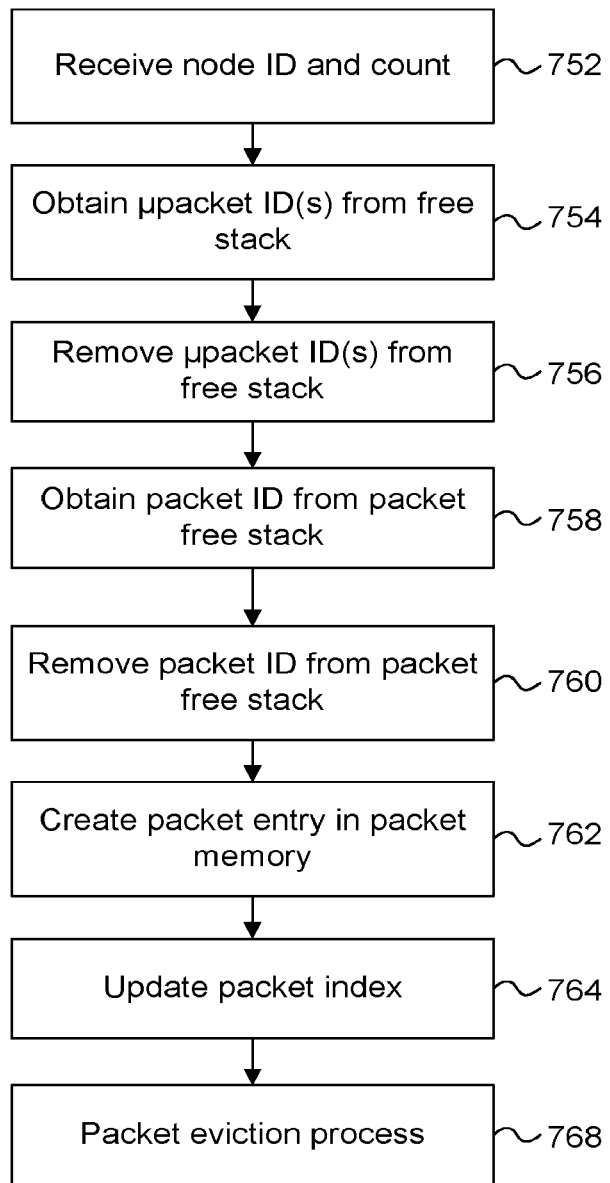
FIG. 11 depicts an example process that can be implemented in a centralized unit according to the disclosure.

FIG. 11 is a more linear depiction of actions taken by the central packet unit 203, which were described above. In step 752 the central packet unit 203 receives, from a particular RAC (e.g. RAC 205), a node identifier and a number of rays to be tested against the identified node. For example, the node identifier and number of rays are received as a result of step 828 implemented by the RAC 205. In step 754 micropacket IDs are obtained from the free stack 453, and in step 756 those micropacket IDs are removed from the free stack 453 (because they are no longer "free"). In step 758 a packet ID is obtained from the packet free stack 452, and in step 760 those packet IDs are removed from the free stack 452 (because they are no longer "free"). It is noted that a "micropacket" is to be provided to a particular RAC, whereas a "packet" may contain a collection of one or more micropackets to be provided to one or more of the RACs. In step 762 a packet entry is created in the packet memory 430 to store data relating to the packet, such as the ray count and identifiers of the different micropackets which are included in the packet. In step 764 the packet memory index 420 is updated to reflect the micropackets which are included in the packet, such that the node ID for the identified node can be used to determine the packet memory index of the packet newly added to the packet memory 430. In step 768 a packet eviction process is performed to evict the packet, which includes sending the micropackets within the packet to the appropriate RACs.

The above figures and explanation mostly relate to an approach where the central packet unit 203 maintains micropacketIDs for the RACs 205-208, assigns the micropacket IDs based on testing update data received from the RACs, decides what nodes to test, and communicates that data by micropacketID transmission to the RACs. As such, this represents a fully centralized decision of testing and allocation of micropacket IDs, but distributed ray packet storage. RACs do not need content associative data structures (such as CAMs which are costly to implement in terms of silicon size and processing power), and the micropacketIDs reference locations in a memory (e.g. 339), and these locations in memory in turn store rayIDs (e.g. 327) that refer to locations in a memory (e.g. 320) storing definition data (e.g. ray definition data). Some implementations may provide that all memories are unified in RACs (e.g. memories 320 and 339), but others allow for physically different memories for each data type (ray data, micropacketID to rayID mappings, and also may provide for caching of node and/or geometry data.)

Figure 12:
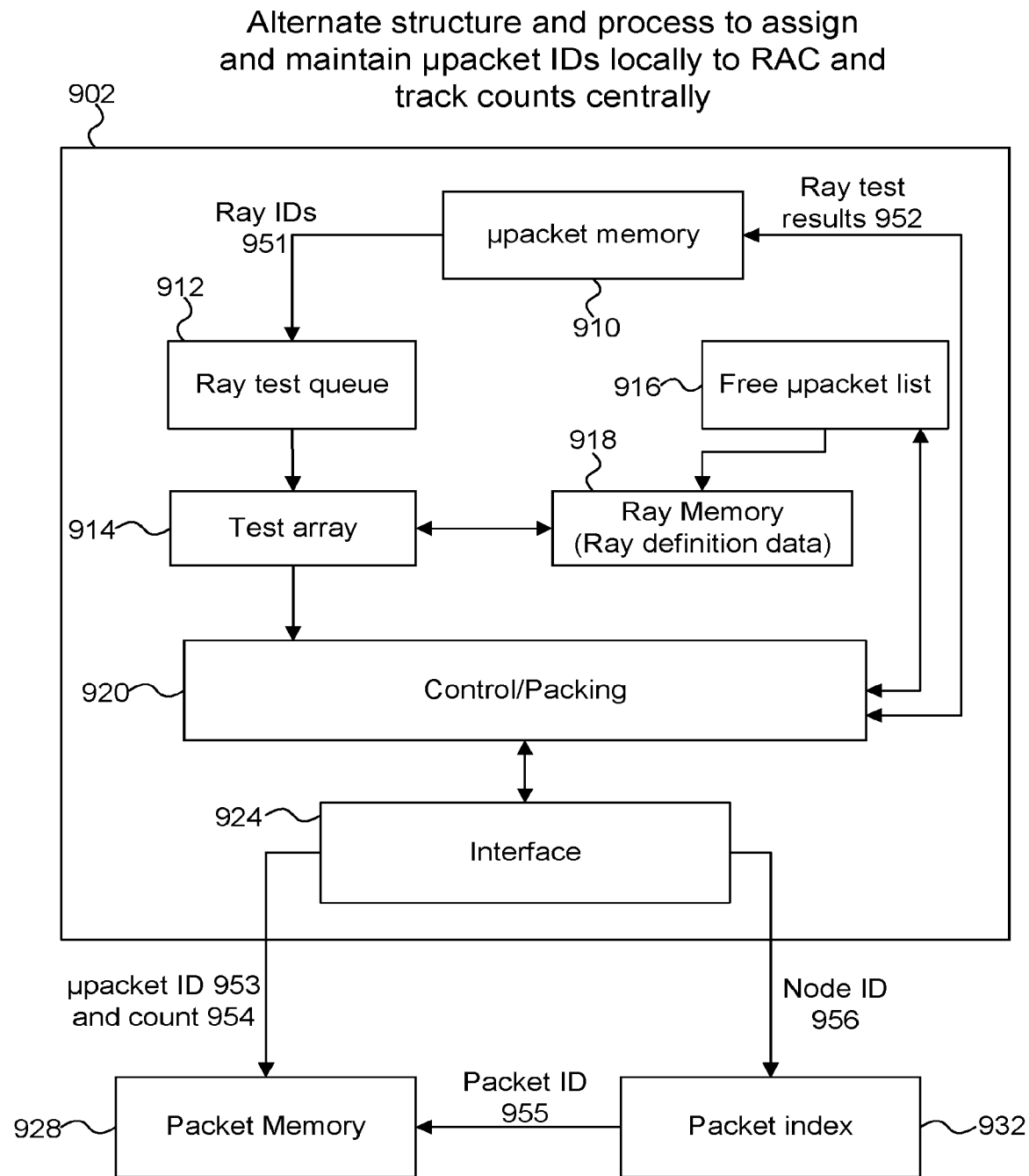
FIG. 12 an alternate example implementation of the system of FIG. 1, in which each RAC maintains and assigns micropacket identifiers for its use but reports micropacket identifiers to the centralized unit for indexing with respect to node identifiers (whereas the example of FIGS. 2-3 provides that the central packet assigns and maintains micropacket identifiers for the RACs)

FIG. 12 depicts an alternate process and data flow through RACs accordingly. A principal difference between this example and the examples described above is that each RAC maintains its own micropacketID free list, assigns micropacketIDs in accordance to a need from its local testing array, and frees in accordance with a testing progress, whereas in the examples described above this functionality was performed centrally by the central packet unit 203. Since micropacketIDs can be chained (i.e. one micropacketID can link to a subsequent one, and so on), a collection of rays that need to be tested for intersection against the same node or nodes of acceleration structure can be identified by the first micropacketID in such a chain. That micropacketID is reported by RAC to the central packet unit, along with a ray count and nodeID (if not otherwise available to the central packet unit). Ray count thus allows the central packet unit to track how many rays await testing against a particular node or nodes. In this implementation, the central packet unit uses the nodeID to identify existing collections (packets) for that nodeID and either appends the micropacketID to an existing collection (packet), if there's room, starts a new collection (packet), or chains a new location in packet memory to the existing collection and adds micropacketID to that new location in packet memory. The central packet unit would thus be servicing these "reports" from one or more RACs, depending on system implementation.

In FIG. 12 a RAC 902 includes a micropacket memory 910 for which can use micropacket IDs as an index to determine ray IDs 951, which can be provided to a ray test queue 912. A test array 914 retrieves ray IDs from the queue 912 and can access definition data of the identified rays from the ray memory 918. The test array 914 performs ray tracing operations, such as intersection testing on the rays. The control/packing unit 920 maintains the micropackets (i.e. which rays are included in which micropackets) using the micropacket free list 916. The results of the testing performed by the test array 914 can result in further rays to be tested which can be packed into micropackets by the control/packing unit 920, and the packed micropackets can be provided back to micropacket memory 910 when they are due to be processed (e.g. when the micropackets are full enough). The interface 924 allows the control/packing unit 920 to communicate with a packet memory 928 and a packet index memory 932. A micropacket ID 953 and ray count 954 are provided to the packet memory 928 and a node ID 956 is provided to the packet index 932. The packet index uses the node ID as an index to determine a packet ID, which is provided to the packet memory 928, such that the micropacketID 953 and ray count 954 can be stored in a packet in the packet memory 928 which has the packet ID provided by the packet index 932. This may involve appending (i.e. updating) the data to a packet in the packet memory 928 if the packet already exists in the packet memory 928, or creating the packet in the packet memory 928 if the packet does not already exist in the packet memory 928.

Some implementations can provide some intermediate consolidation of data from different RACs. For example, prior to indexing, reports that refer to the same Node ID can be consolidated, allowing fewer separate indexes to a content associative structure. Counts can be maintained or added together. Note that this addition can occur in parallel with the indexing. In some implementations, there will be a single count for a single node ID, such that multiple additions would occur if reports were separately added, so in some implementations, intermediate additions in parallel can allow a reduction in a total cycle time. Note also that the counts can be counts of numbers of micropacketIDs, not pure ray counts. For example, each RAC can indicate how many micropacketIDs are linked to a particular reported micropacketID. If a micropacket entry in RAC memory can store 16 rayIDs for example, then the count will be biased upwards if partially full micropackets are reported. Round up or down can be implemented. Since these counts may be used primarily for eviction logic, the same bias across all micropackets would be expected to effectively cancel out. That expectation can be empirically tested and implementation details determined accordingly.

Figure 13:
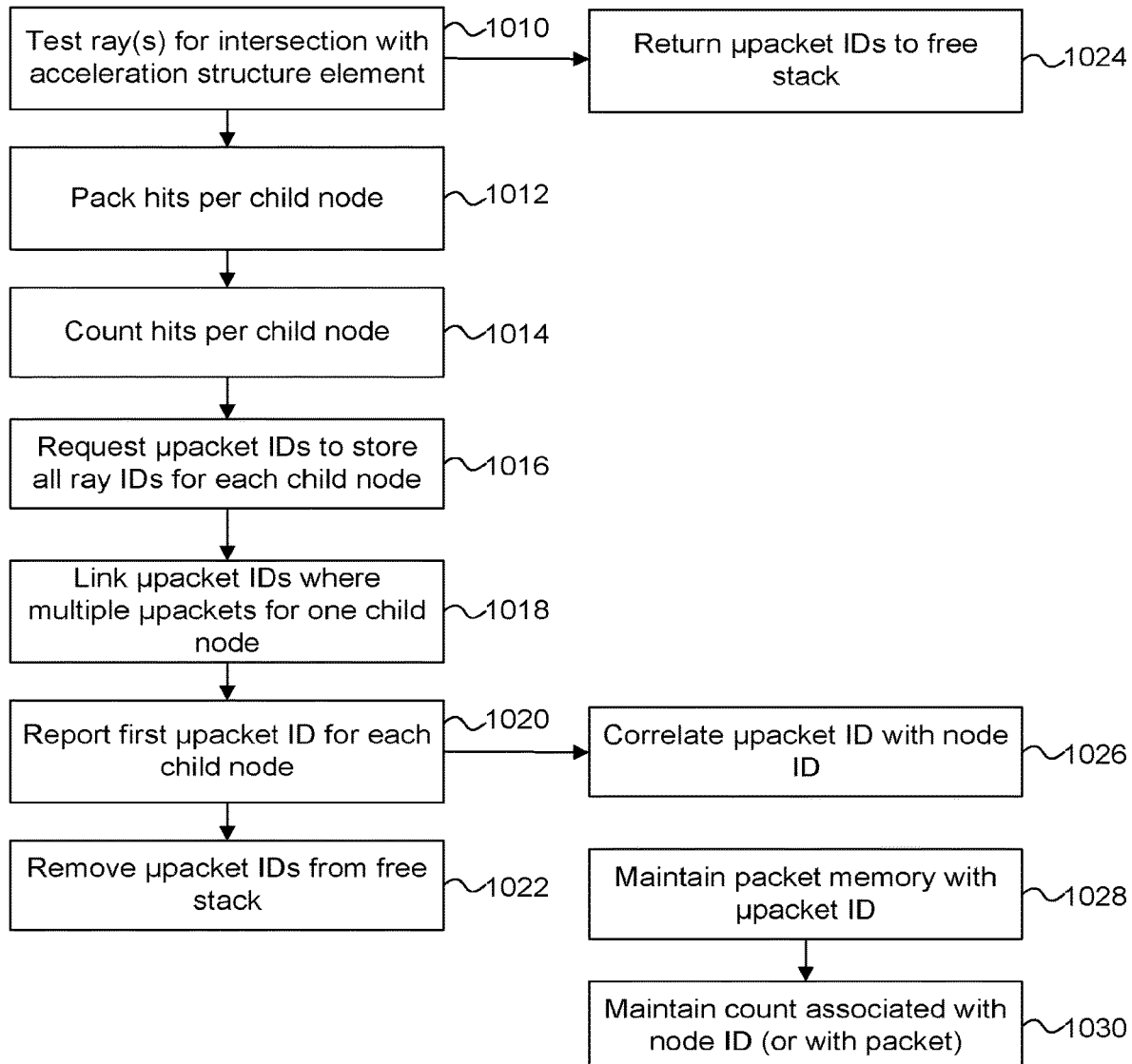
FIG. 13 depicts an example process implemented in a system using the RAC of FIG. 12.

FIG. 13 depicts a process implemented by a system operating according to FIG. 12 (where 1010-1024 are implemented by RACs and 1026-1030 are implemented by a central packet unit). In step 1010 the test array 914 tests one or more rays for intersection with a node of an acceleration structure. When the testing is complete, in step 1024 the micropacket IDs for the rays which have been tested are returned to the free stack 916 so that they can be re-used for other rays. Furthermore, following step 1010, in step 1012 intersection hits are packed together per child node (the child nodes being children of the node that was tested in step 1010 in the acceleration structure). In step 1014 the control unit 920 counts the hits per child node from the rays that were tested. In step 1016 micropacket IDs are requested for storing the ray IDs for each child node. In step 1018 micropacket IDs are linked where there are multiple micropackets for one child node. In step 1020 the first micropacket ID for each child node is reported to the central packet unit. Then in step 1022 the micropacket IDs for the child nodes are removed from the free stack 916. In step 1026 the central packet unit correlates the received micropacket ID with the node ID. In step 1028 the packet memory 928 is maintained (e.g. updated or created) in accordance with the micropacket ID, and in step 1030 the count associated with the node ID or with a packet in the packet memory 928 is maintained (e.g. updated or created).

Figure 14:
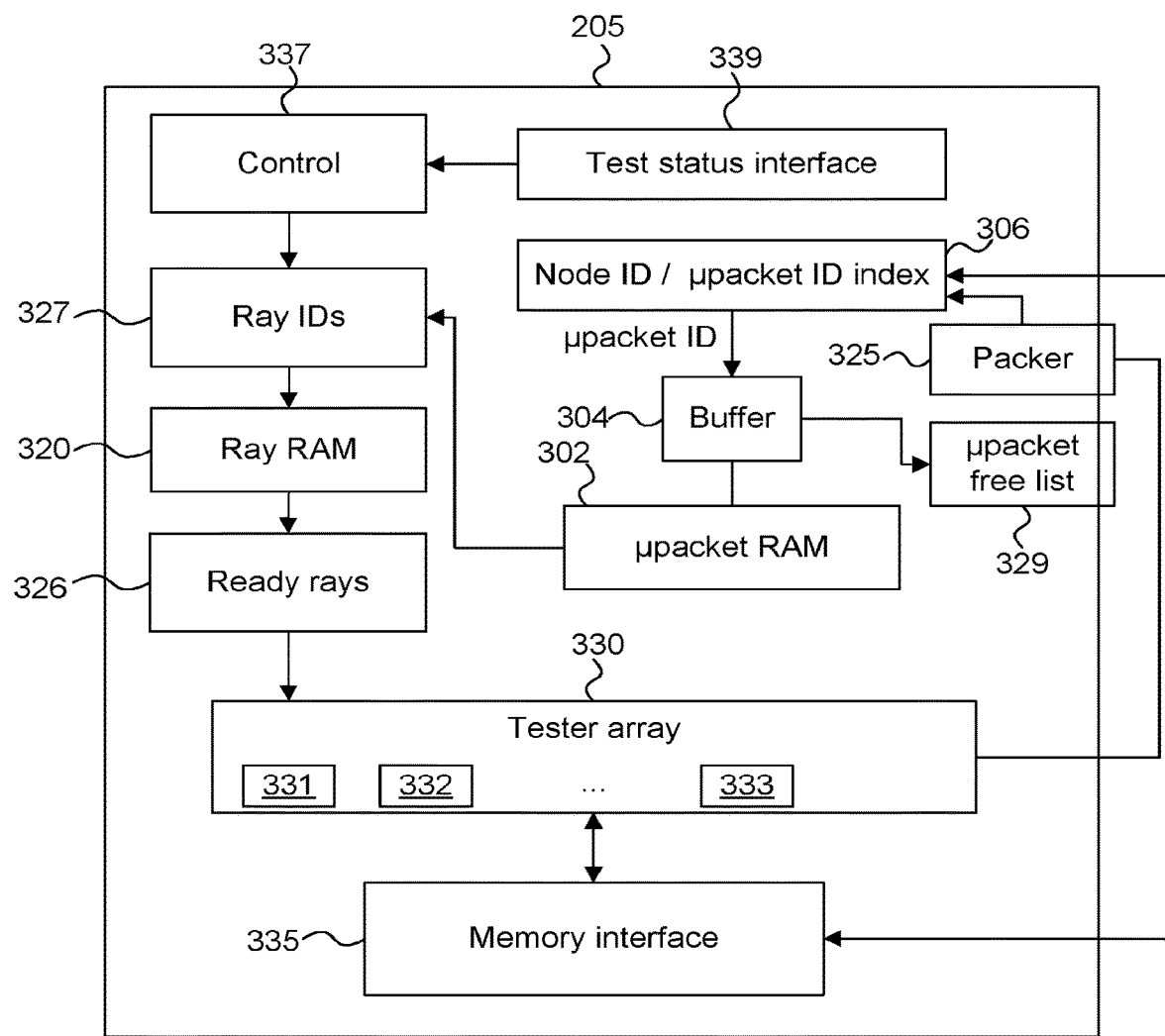
FIG. 14 depicts a RAC in which each RAC maintains a node ID to micropacket index and receives node identifiers for ray scheduling from the centralized unit.

FIG. 14 depicts a variation on FIGS. 12-13. FIG. 14 shows an RAC 205, and the other RACs may have a similar structure. In FIG. 14, each RAC maintains a content associative memory indexing micropacketIDs to nodeIDs. Each RAC reports results of testing nodeID(s) as a count of rays/micropackets and an associated nodeID or ID(s). The central packet unit indicates what node definition data is being pre-fetched by sending out nodeIDs. The nodeIDs are then used for the content associative indexing. This implementation allows the central packet unit to have counts for how many rays need to traverse particular node(s) of the acceleration structure.

The node data can reside in a temporary cache or similar structure until it is fully consumed by all of the RACs that require access to it. That structure may track read access counts in order to release the node data when it is no longer needed. Alternatively the central could broadcast the node data, and then the RAC could retain relevant node data in local memories.

As shown in FIG. 14 the RAC 205 includes an interface 339 for receiving test states, a control unit 337 for controlling the RAC 205, a micropacket memory 302 which can be indexed to output ray IDs 327 which can be used to index a ray memory 320 to determine rays to be tested. Rays to be tested are stored in the ready rays memory 326 which can be polled by the tester array 330 for determining rays to be tested (e.g. intersection tested by the execution units 331-333). A node ID/packet ID index memory 306 can use an input node ID as an index to determine a micropacket ID to be provided as an index to the micropacket memory 302, via a buffer 304.

Figure 15:
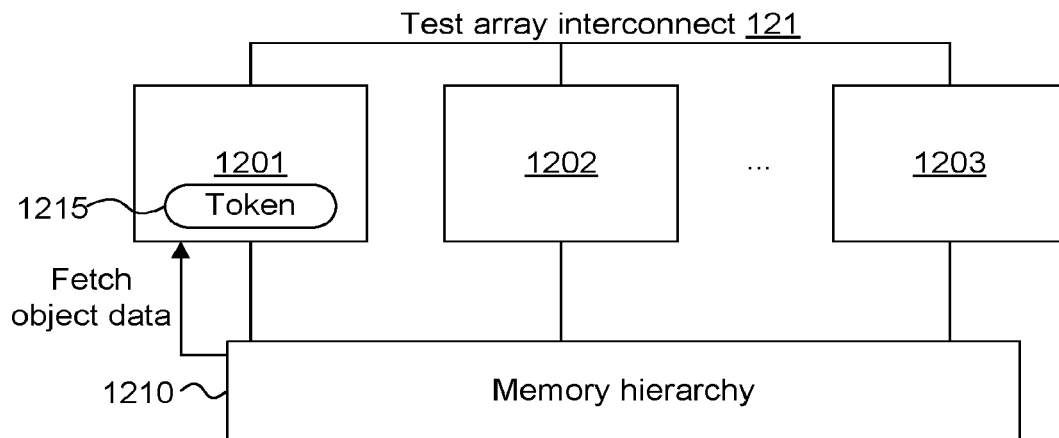
FIG. 15 depicts an example implementation of a distributed set of RACs, in which each RAC determines what node is to be tested with respect to its own local ray data, but indicates to other RACs its scheduling decisions.

FIG. 15 depicts a distributed lead/follow architecture that does not have a centralized element that tracks counts associated with nodeIDs. In an example, RACs 1201-1203 have a round-robin token that indicates which RAC gets to decide what processing to perform next. Implementations do not necessarily have to cause RACs to strictly follow what the token-holder RAC does. Instead, each RAC can use the information as a hint to what data may be available in a shared cache, or cache hierarchy.

Figure 16:
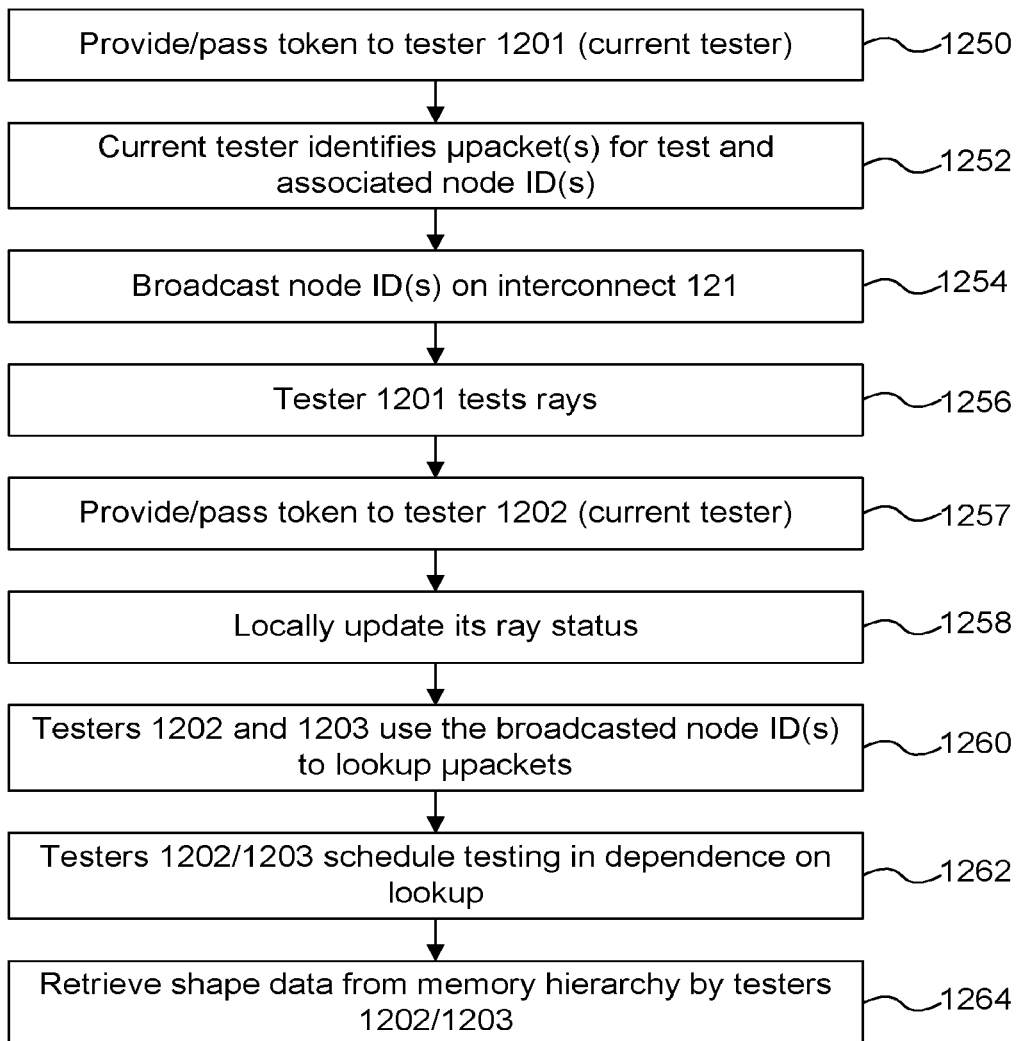
FIG. 16 depicts an example process implemented for FIG. 15.

FIG. 16 presents example aspects of a process that can be implemented by a system according to FIG. 15. In step 1250 the token is passed to a RAC (or "tester"). In step 1252 the current RAC (e.g. tester 1201) identifies micropacket IDs to be tested and the associated node IDs of the nodes to be tested against the rays identified in the micropacket. In step 1254 the identified node IDs are broadcast on the interconnect 121 to the other testers (e.g. 1202 and 1203). In step 1256 the tester 1201 tests the rays with the node(s). In step 1257 the token be passed to another tester, e.g. tester 1202, which then becomes the "current tester". The method passes back to step 1252 and repeats for the tester 1202. Furthermore, following step 1257, in step 1258 the tester 1201 locally updates its ray status. In step 1260 the other testers (1202 and 1203) use the broadcasted node IDs to lookup micropackets, and in step 1262 the testers 1202 and 1203 schedule testing in dependence on the results of the lookup. In step 1264 shape data is retrieved from the memory hierarchy 1210 to be tested by testers 1202 and 1203.

Figure 17:
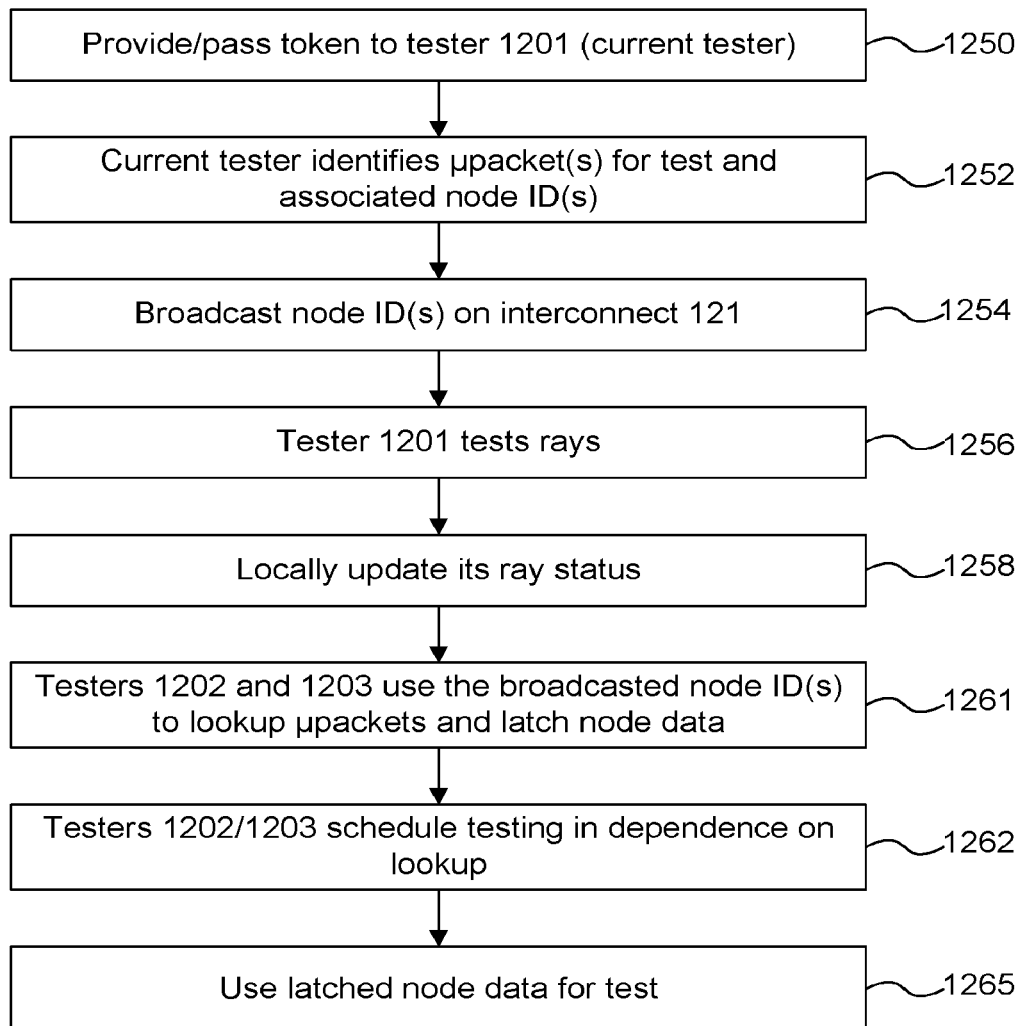
FIG. 17 depicts another example process implemented for FIG. 15.

FIG. 17 depicts an alternate FIG. 16. A principal difference is that in FIG. 17, one RAC can retrieve data from a memory hierarchy and pass it to the other RACs, instead of each RAC obtaining that same data. In step 1250 the token is passed to a RAC (or "tester"). In step 1252 the current RAC (e.g. tester 1201) identifies micropacket IDs to be tested and the associated node IDs of the nodes to be tested against the rays identified in the micropacket. In step 1254 the identified node IDs are broadcast on the interconnect 121 to the other testers (e.g. 1202 and 1203). In step 1256 the tester 1201 tests the rays with the node(s). In step 1258 the tester 1201 locally updates its ray status. In step 1261 the other testers (1202 and 1203) use the broadcasted node IDs to lookup micropackets and latch the node data, and in step 1262 the testers 1202 and 1203 schedule testing in dependence on the results of the lookup. In step 1265 the latched node data is used for the testing by testers 1202 and 1203.

In systems implementing FIG. 17, it may be desirable to provide that only one or a selection of RACs has access to the memory hierarchy, and in effect, when RACs that do not have access to the memory hierarchy decide a nodeID to be tested, a RAC that does have such access will be responsible for obtaining that data. Such an approach may allow a memory hierarchy to have fewer ports to RACs, and allow local interconnect to handle this data exchange/sharing.

Figure 18:
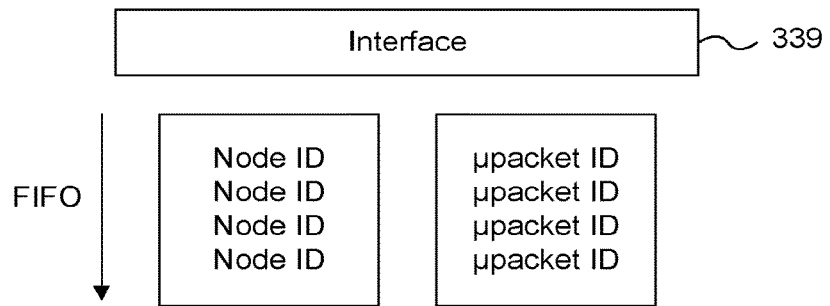
FIG. 18 depicts an example of buffering nodeIDs in a RAC according to the example of FIG. 15.

FIG. 18 depicts that a given RAC may have a queue, FIFO, or other data structure that latches node identifiers that were transmitted on a bus or other interconnect among the RACs of FIG. 15. Each RAC would then conduct a content associative search to obtain information about its status for that NodeID. For example, such information can include a micropacketID (chain thereof), as well as a count of micropacketIDs or rays that await processing relative to that nodeID. In some cases, there may be no rays in a particular RAC corresponding to a nodeID. Such nodeID could be dropped. In some situations, it can be buffered but deprioritized in favor of other nodeIDs that have work or more work to be done. Similar functions can be implemented for nodeIDs that have relatively little work to be done.

Figure 19A:
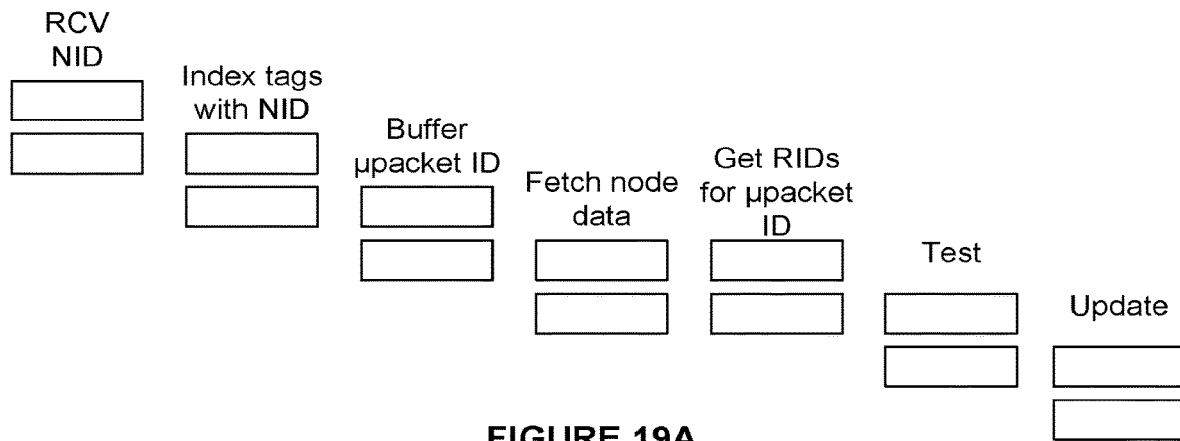
FIGS. 19A and 19B depict examples of pipelining processing for a lead/follow implementation according to FIG. 15.
Figure 19B:
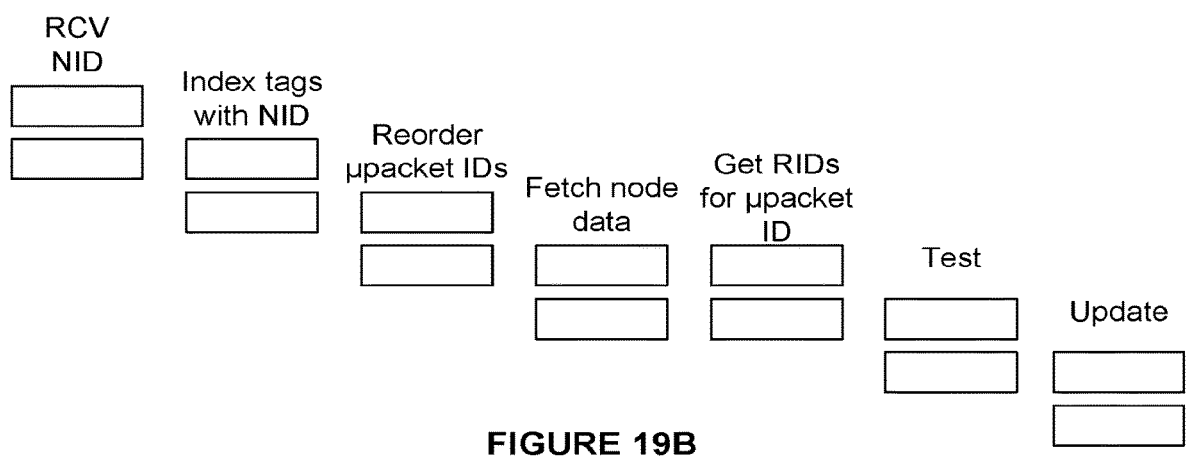

FIGS. 19A and 19B depict examples of two different pipeline processes. In one example, the indexing of tags with the nodeID (or part of) also can produce a count or indication of an amount of work at the RAC waiting to be done with that nodeID as part of the result produced. Alternatively, indexing of a different structure can occur in parallel, before or after the micropacketID indexing. In some implementations, simply having a micropacketID outputted from the indexing causes scheduling for testing, such that tracking of total micropackets or rays for that nodeID is not done. FIG. 19A shows an in-order processing, FIG. 19B shows a reorder step that can use count as an input.

In all of the above examples, it is not necessarily required to provide the entirety of a nodeID, nor is it necessary to track traversal progress at a granularity of node by node testing. Instead, collections of rays can be tracked by node identifiers that refer to leaflets of an acceleration structure, which have some relatively small number of elements, and RACs traverse the entire leaflet when initiating testing. In some implementations, a leaflet can be tuned to a cache line of the implementation or some number of cache lines. Some implementations may allow all of the children of a particular node to be referenced by fewer than all bits of a nodeID, and providing a given number of bits of a nodeID can indicate that all children are to be tested. Data representing the child nodes can be arranged to indicate situations where less than all possible slots of acceleration structure have child nodes, in a particular situation.

MicropacketID(s) references, node identifiers, ray identifiers can be compressed according to ranges.

In one approach, the structures of FIG. 1 are linked to processing elements in a GPU as follows. A GPU has programmable shading elements. A RAC (e.g. 205) can be associated with one or more shading elements. In an example, a shading cluster (e.g. clusters 221 to 224) can have a 1:1 correspondence with a RAC (e.g. respective RACs 205 to 208). The shading cluster (e.g. 221) and RAC (e.g. 205) can be sized appropriately to be balanced for expected ray processing workloads/shading. These shading elements can emit rays to be processed. Rays emitted by a particular shading cluster are provided to RAC associated with that cluster. Definition data for those rays is initially stored and remains in local RAC memory for life of ray. If an intersection is found for a ray by the RAC 205, it is shaded by the associated cluster 221. Higher level control can decide what parts of a frame being rendered to send to which cluster/RACs as a higher level control over RAC usage. The compute clusters (e.g. 221) can be executing shaders for both rasterization and ray shading. Higher level work flow control can take into account issues of shading complexity, as well as status information for both shading clusters and associated RACs. Control signals can be provided from higher level control to RACs to opportunistically increase ray shading load. For example, by prioritizing micropacketIDs that refer to leaf nodes of an acceleration structure defining geometry to be processed, more ray shading work can be created for the cluster, and the converse is also true.

Aspects of the disclosure were described with respect to a workload of graphics and more specifically to graphics using ray tracing. Aspects of the disclosure can be applied to different workloads. Such workloads can be other graphics workloads, or workloads for other purposes such as pattern recognition, and database searching. Another example of a graphics workload is photon query resolution. For example, RACs can instead (or additionally) service photon queries that can return k (k>=1) photons nearest a locus (point in space). This can in turn be generalized to a query to identify k members of a set that are most similar to a specified memory, or to a specified set of characteristics, or values for a set of parameters that parameterize a search space.

In some implementations, the test arrays function in SIMD, such that each cell of the array performs the same processing on different elements of a set. Masking techniques can be used to achieve partial width SIMD processing. In some situations, one input to the test array will be constant among all cells, while another input will vary. In other situations, all inputs can differ, although such implementation would require more input bandwidth.

While nodeIDs were described as identifying elements of an acceleration structure, nodeIDs also can identify points in code to be executed, or modules of code, or a particular subset of keys in a database (a range of values) or other subsets of a space to be searched, or workload to be executed.

Implementations can have different numbers of RACs, and/or RACs can have different numbers of test cells in their arrays. Bandwidth and sizes of other structures can be sized accordingly.

For clarity in description, data for a certain type of object, e.g., a primitive (e.g., coordinates for three vertices of a triangle) often is described simply as the object itself, rather than referring to the data for the object. For example, if referring to "fetching a primitive", it is to be understood that data representative of that primitive is being fetched.

Figure 20:
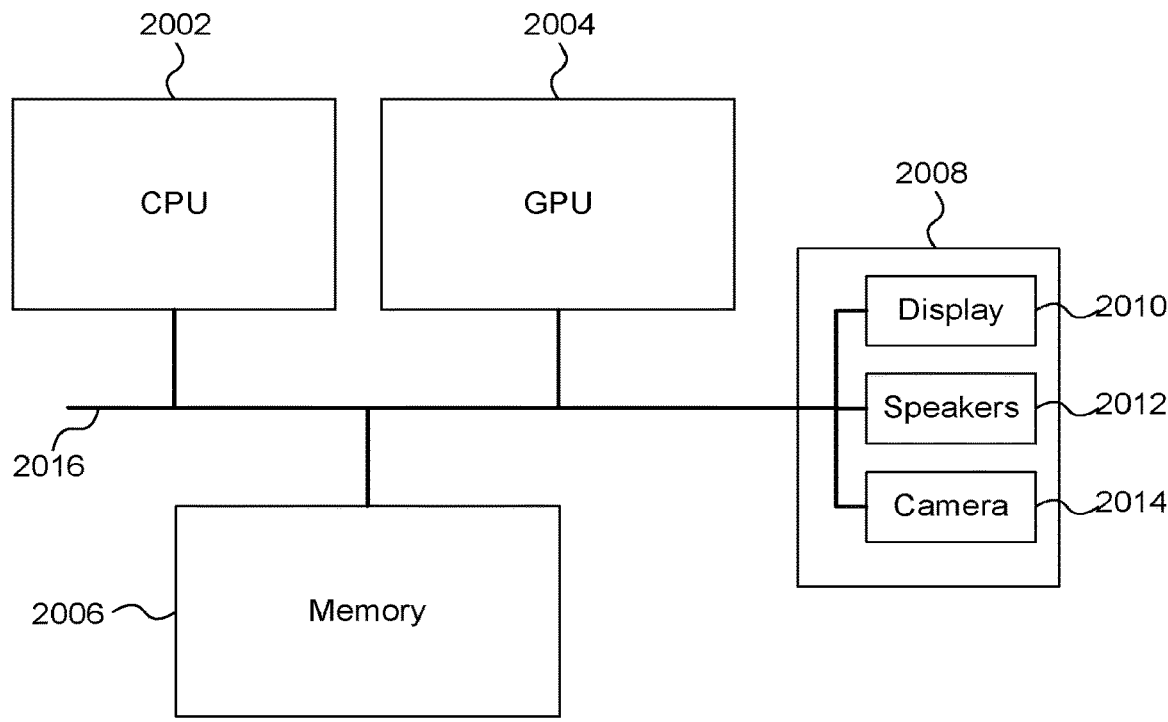
FIG. 20 shows a computer system in which a graphics processing system is implemented.

FIG. 20 shows a computer system in which the graphics processing systems described herein may be implemented. The computer system comprises a CPU 2002, a GPU 2004, a memory 2006 and other devices 2008, such as a display 2010, speakers 2012 and a camera 2014. The components of the computer system can communicate with each other via a communications bus 2016. The systems described herein may be implemented on the GPU 2004.

The rendering systems described herein are shown in the figures as comprising a number of functional blocks. This is schematic only and is not intended to define a strict division between different logic elements of such entities. Each functional block may be provided in any suitable manner. It is to be understood that intermediate values described herein as being formed by a rendering system need not be physically generated by the rendering system at any point and may merely represent logical values which conveniently describe the processing performed by the rendering system between its input and output.

The rendering systems described herein may be embodied in hardware on an integrated circuit. The rendering systems described herein may be configured to perform any of the methods described herein. Generally, any of the functions, methods, techniques or components described above can be implemented in software, firmware, hardware (e.g., fixed logic circuitry), or any combination thereof. The terms "module," "functionality," "component", "element", "unit", "block" and "logic" may be used herein to generally represent software, firmware, hardware, or any combination thereof In the case of a software implementation, the module, functionality, component, element, unit, block or logic represents program code that performs the specified tasks when executed on a processor. The algorithms and methods described herein could be performed by one or more processors executing code that causes the processor(s) to perform the algorithms/methods. Examples of a computer-readable storage medium include a random-access memory (RAM), read-only memory (ROM), an optical disc, flash memory, hard disk memory, and other memory devices that may use magnetic, optical, and other techniques to store instructions or other data and that can be accessed by a machine.

The terms computer program code and computer readable instructions as used herein refer to any kind of executable code for processors, including code expressed in a machine language, an interpreted language or a scripting language. Executable code includes binary code, machine code, byte-code, code defining an integrated circuit (such as a hardware description language or netlist), and code expressed in a programming language code such as C, Java or OpenCL. Executable code may be, for example, any kind of software, firmware, script, module or library which, when suitably executed, processed, interpreted, compiled, executed at a virtual machine or other software environment, cause a processor of the computer system at which the executable code is supported to perform the tasks specified by the code.

A processor, computer, or computer system may be any kind of device, machine or dedicated circuit, or collection or portion thereof, with processing capability such that it can execute instructions. A processor may be any kind of general purpose or dedicated processor, such as a CPU, GPU, System-on-chip, state machine, media processor, an application-specific integrated circuit (ASIC), a programmable logic array, a field-programmable gate array (FPGA), or the like. A computer or computer system may comprise one or more processors.

It is also intended to encompass software which defines a configuration of hardware as described herein, such as HDL (hardware description language) software, as is used for designing integrated circuits, or for configuring programmable chips, to carry out desired functions. That is, there may be provided a computer readable storage medium having encoded thereon computer readable program code in the form of an integrated circuit definition dataset that when processed in an integrated circuit manufacturing system configures the system to manufacture a rendering system configured to perform any of the methods described herein, or to manufacture a rendering system comprising any apparatus described herein. An integrated circuit definition dataset may be, for example, an integrated circuit description.

An integrated circuit definition dataset may be in the form of computer code, for example as a netlist, code for configuring a programmable chip, as a hardware description language defining an integrated circuit at any level, including as register transfer level (RTL) code, as high-level circuit representations such as Verilog or VHDL, and as low-level circuit representations such as OASIS (RTM) and GDSII. Higher level representations which logically define an integrated circuit (such as RTL) may be processed at a computer system configured for generating a manufacturing definition of an integrated circuit in the context of a software environment comprising definitions of circuit elements and rules for combining those elements in order to generate the manufacturing definition of an integrated circuit so defined by the representation. As is typically the case with software executing at a computer system so as to define a machine, one or more intermediate user steps (e.g. providing commands, variables etc.) may be required in order for a computer system configured for generating a manufacturing definition of an integrated circuit to execute code defining an integrated circuit so as to generate the manufacturing definition of that integrated circuit.

An example of processing an integrated circuit definition dataset at an integrated circuit manufacturing system so as to configure the system to manufacture a rendering system will now be described with respect to FIG. 21.

Figure 21:
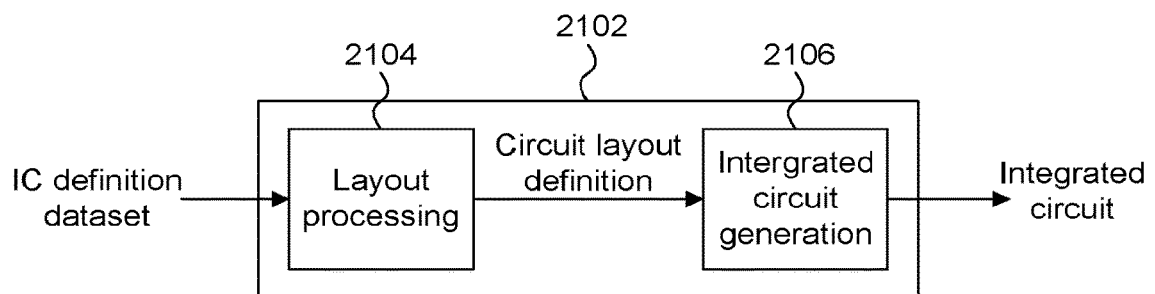
FIG. 21 shows an integrated circuit manufacturing system for generating an integrated circuit embodying a rendering system.

FIG. 21 shows an example of an integrated circuit (IC) manufacturing system 2102 which comprises a layout processing system 2104 and an integrated circuit generation system 2106. The IC manufacturing system 2102 is configured to receive an IC definition dataset (e.g. defining a rendering system as described in any of the examples herein), process the IC definition dataset, and generate an IC according to the IC definition dataset (e.g. which embodies a rendering system as described in any of the examples herein). The processing of the IC definition dataset configures the IC manufacturing system 2102 to manufacture an integrated circuit embodying a rendering system as described in any of the examples herein.

The layout processing system 2104 is configured to receive and process the IC definition dataset to determine a circuit layout. Methods of determining a circuit layout from an IC definition dataset are known in the art, and for example may involve synthesising RTL code to determine a gate level representation of a circuit to be generated, e.g. in terms of logical components (e.g. NAND, NOR, AND, OR, MUX and FLIP-FLOP components). A circuit layout can be determined from the gate level representation of the circuit by determining positional information for the logical components. This may be done automatically or with user involvement in order to optimise the circuit layout. When the layout processing system 2104 has determined the circuit layout it may output a circuit layout definition to the IC generation system 2106. A circuit layout definition may be, for example, a circuit layout description.

The IC generation system 2106 generates an IC according to the circuit layout definition, as is known in the art. For example, the IC generation system 2106 may implement a semiconductor device fabrication process to generate the IC, which may involve a multiple-step sequence of photo lithographic and chemical processing steps during which electronic circuits are gradually created on a wafer made of semiconducting material. The circuit layout definition may be in the form of a mask which can be used in a lithographic process for generating an IC according to the circuit definition. Alternatively, the circuit layout definition provided to the IC generation system 2106 may be in the form of computer-readable code which the IC generation system 2106 can use to form a suitable mask for use in generating an IC.

The different processes performed by the IC manufacturing system 2102 may be implemented all in one location, e.g. by one party. Alternatively, the IC manufacturing system 2102 may be a distributed system such that some of the processes may be performed at different locations, and may be performed by different parties. For example, some of the stages of: (i) synthesising RTL code representing the IC definition dataset to form a gate level representation of a circuit to be generated, (ii) generating a circuit layout based on the gate level representation, (iii) forming a mask in accordance with the circuit layout, and (iv) fabricating an integrated circuit using the mask, may be performed in different locations and/or by different parties.

In other examples, processing of the integrated circuit definition dataset at an integrated circuit manufacturing system may configure the system to manufacture a rendering system without the IC definition dataset being processed so as to determine a circuit layout. For instance, an integrated circuit definition dataset may define the configuration of a reconfigurable processor, such as an FPGA, and the processing of that dataset may configure an IC manufacturing system to generate a reconfigurable processor having that defined configuration (e.g. by loading configuration data to the FPGA).

In some embodiments, an integrated circuit manufacturing definition dataset, when processed in an integrated circuit manufacturing system, may cause an integrated circuit manufacturing system to generate a device as described herein. For example, the configuration of an integrated circuit manufacturing system in the manner described above with respect to FIG. 21 by an integrated circuit manufacturing definition dataset may cause a device as described herein to be manufactured.

In some examples, an integrated circuit definition dataset could include software which runs on hardware defined at the dataset or in combination with hardware defined at the dataset. In the example shown in FIG. 21, the IC generation system may further be configured by an integrated circuit definition dataset to, on manufacturing an integrated circuit, load firmware onto that integrated circuit in accordance with program code defined at the integrated circuit definition dataset or otherwise provide program code with the integrated circuit for use with the integrated circuit.

The applicant hereby discloses in isolation each individual feature described herein and any combination of two or more such features, to the extent that such features or combinations are capable of being carried out based on the present specification as a whole in the light of the common general knowledge of a person skilled in the art, irrespective of whether such features or combinations of features solve any problems disclosed herein. In view of the foregoing description it will be evident to a person skilled in the art that various modifications may be made within the scope of the invention.

What is claimed is:

1. A machine-implemented method of processing rays, comprising:
at a first computation unit of a plurality of computation units:
selecting a group of rays to be processed for intersection with an element of an acceleration structure, wherein the element of the acceleration structure is identifiable with a identifier, and
indicating the identifier to the other computation units of the plurality of computation units; and
at the other computation units of the plurality of computation units:
indexing a memory using the identifier of the element of the acceleration structure indicated by the first computation unit to determine whether a respective local memory to that computation unit contains definition data for a group of rays to be tested for intersection with the element of the acceleration structure identifiable with the identifier, and
in dependence on the determination of whether a respective local memory to that computation unit contains definition data for a group of rays to be tested for intersection with the element of the acceleration structure identifiable with the identifier, determining whether to schedule testing of that group of rays in that computation unit for intersection with the element of the acceleration structure identifiable with the identifier, or to schedule another group of rays, for which definition data is stored in the respective local memory of that computation unit, for intersection with one or more other acceleration structure elements.

2. The machine-implemented method of processing rays of claim 1, wherein, if any of the other computation units determine to test a respective group of rays for intersection with an element of the acceleration structure, each of those computation units retrieves the data defining that element from a cache comprising data loaded from a main memory in order to perform the testing.

3. The machine-implemented method of processing rays of claim 1, wherein, if any of the other computation units determine to test a respective group of rays for intersection with an element of the acceleration structure, each of those computation units receives the data defining that element from the computation unit that initially selected the group of rays.

4. The machine-implemented method of processing rays of claim 1, further comprising, at each of the computation units, maintaining a queue of identifiers received from other computation units.

5. The machine-implemented method of processing rays of claim 1, further comprising, providing each of the computation units a respective opportunity to make a selection of an element of the acceleration structure, for which that computation unit will test one or more groups of rays for intersection, and thereafter choosing by the other of the computation units whether or not to use that same element of the acceleration structure in an intersection test.

6. The machine-implemented method of processing rays of claim 1, wherein the rays are virtual rays.

7. The machine-implemented method of processing rays of claim 1, wherein indicating the identifier to the other computation units comprises broadcasting the identifier to the other computation units.

8. The machine-implemented method of processing rays of claim 1, wherein the element of an acceleration structure is a node of the acceleration structure.

9. The machine-implemented method of processing rays of claim 1, wherein each element of an acceleration structure bounds a respective selection of geometry located in a 3-D space.

10. The machine-implemented method of processing rays of claim 1, further comprising, at the first computation unit, initiating retrieval, from a memory, of data defining the element of the acceleration structure.

11. The machine-implemented method of processing rays of claim 1, further comprising, at the first computation unit, obtaining data defining the rays of the group of rays from a memory local to the first computation unit.

12. The machine-implemented method of processing rays of claim 1, further comprising, at the first computation unit, determining whether each of the rays hits or misses the element of the acceleration structure.

13. A rendering system comprising:
a plurality of computation units, wherein a first computation unit of said plurality of computation units is configured to:
select a group of rays to be processed for intersection with an element of an acceleration structure, wherein the element of the acceleration structure is identifiable with a identifier, and
indicate the identifier to the other computation units of the plurality of computation units; and
wherein the other computation units of the plurality of computation units are configured to:
index a memory using the identifier of the element of the acceleration structure indicated by the first computation unit to determine whether a respective local memory to that computation unit contains definition data for a group of rays to be tested for intersection with the element of the acceleration structure identifiable with the identifier, and
in dependence on the determination of whether a respective local memory to that computation unit contains definition data for a group of rays to be tested for intersection with the element of the acceleration structure identifiable with the identifier, determine whether to schedule testing of that group of rays in that computation unit for intersection with the element of the acceleration structure identifiable with the identifier, or to schedule another group of rays, for which definition data is stored in the respective local memory of that computation unit, for intersection with one or more other acceleration structure elements.

14. The rendering system of claim 13, wherein the rendering system is configured such that if any of the other computation units determine to test a respective group of rays for intersection with an element of the acceleration structure, each of those computation units retrieves the data defining that element from a cache comprising data loaded from a main memory in order to perform the testing.

15. The rendering system of claim 13, wherein the rendering system is configured such that if any of the other computation units determine to test a respective group of rays for intersection with an element of the acceleration structure, each of those computation units receives the data defining that element from the computation unit that initially selected the group of rays.

16. The rendering system of claim 13, wherein each of the computation units is configured to maintain a queue of identifiers received from other computation units.

17. The rendering system of claim 13, wherein the rendering system is configured to provide each of the computation units a respective opportunity to make a selection of an element of the acceleration structure, for which that computation unit will test one or more groups of rays for intersection, and thereafter choose by the other of the computation units whether or not to use that same element of the acceleration structure in an intersection test.

18. The rendering system of claim 13, wherein the rays are virtual rays.

19. The rendering system of claim 13, wherein the first computation unit is configured to indicate the identifier to the other computation units by broadcasting the identifier to the other computation units.

20. The rendering system of claim 13, wherein the element of an acceleration structure is a node of the acceleration structure.

* * * * *